US012421791B2

(12) United States Patent
Shah

(10) Patent No.: US 12,421,791 B2
(45) Date of Patent: Sep. 23, 2025

(54) ELECTRONIC DELIVERY DOOR

(71) Applicant: Syed Baber Ali Shah, Oakville (CA)

(72) Inventor: Syed Baber Ali Shah, Oakville (CA)

( * ) Notice: Subject to any disclaimer, the term of this patent is extended or adjusted under 35 U.S.C. 154(b) by 0 days.

(21) Appl. No.: 17/881,359

(22) Filed: Aug. 4, 2022

(65) Prior Publication Data

US 2023/0043156 A1 Feb. 9, 2023

Related U.S. Application Data

(60) Provisional application No. 63/230,281, filed on Aug. 6, 2021.

(51) Int. Cl.
*E06B 7/32* (2006.01)
*E05F 15/76* (2015.01)

(52) U.S. Cl.
CPC ................ *E06B 7/32* (2013.01); *E05F 15/76* (2015.01); *E05Y 2400/44* (2013.01); *E05Y 2400/45* (2013.01); *E05Y 2400/85* (2013.01); *E05Y 2400/8505* (2024.05); *E05Y 2800/71* (2013.01); *E05Y 2900/132* (2013.01)

(58) Field of Classification Search
CPC .................................. E06B 7/32; A47G 29/14
See application file for complete search history.

(56) References Cited

U.S. PATENT DOCUMENTS

| | | | | |
|---|---|---|---|---|
| 7,246,562 | B2 * | 7/2007 | Lee | E06B 7/32 109/19 |
| 7,798,103 | B2 | 9/2010 | Bosserdet, Jr. et al. | |
| 8,141,296 | B2 * | 3/2012 | Bem | E05B 65/0035 49/340 |
| 10,512,351 | B1 * | 12/2019 | Valeriano | E05B 47/0001 |
| 11,346,150 | B1 * | 5/2022 | Johnston | E06B 7/32 |
| 2014/0190081 | A1 | 7/2014 | Wanjohi | |
| 2019/0226265 | A1 * | 7/2019 | Ahmad | G05B 19/416 |
| 2021/0082219 | A1 * | 3/2021 | Kane | G07C 9/00182 |

FOREIGN PATENT DOCUMENTS

| | | | | |
|---|---|---|---|---|
| CN | 105625918 | B | 9/2017 | |
| CN | 210422370 | U * | 4/2020 | E06B 3/36 |
| KR | 200432303 | Y1 | 11/2006 | |
| KR | 20090070016 | A | 7/2009 | |
| KR | 101084755 | B1 | 11/2011 | |
| KR | 101104992 | B1 | 1/2012 | |
| KR | 101157164 | B1 | 7/2012 | |
| KR | 101163079 | B1 | 7/2012 | |

* cited by examiner

*Primary Examiner* — Marcus Menezes
(74) *Attorney, Agent, or Firm* — Blake, Cassels & Graydon LLP; Christopher N. Hunter; Laurie Wright

(57) ABSTRACT

Described is an electronic delivery door for permitting passage of an object between an interior and an exterior of a structure through an opening defined in the structure, the delivery door comprising: a door panel; a hinge assembly including: one or more hinges for securing the door panel within the opening of the structure and for permitting the door panel to move between a closed position and an open position by rotation of the one or more hinges, wherein: in the closed position, the opening is covered by the door panel; and in the open position, the one or more hinges have been rotated to permit passage of objects through the opening; and an electronic security device configured to selectively permit opening of the door panel.

15 Claims, 27 Drawing Sheets

ELECTRONIC DELIVERY DOOR

CROSS-REFERENCE TO RELATED APPLICATIONS

The present application claims priority from U.S. Provisional Application No. 63/230,281 filed on Aug. 6, 2021, incorporated herein by reference in its entirety.

TECHNICAL FIELD

The following generally relates to delivery doors and systems, particularly delivery doors and systems for allowing delivery to and retrieval from an interior of a private property without physical assistance from someone with access to the property.

BACKGROUND

Reliance on online shopping as well as other online services, such as food, grocery, and laundry delivery, continues to increase. The frequency of deliveries to private properties, such as homes, businesses, and apartments, is thus also increasing, as well as porch piracy, i.e., theft of delivered objects left at the property.

Typically, someone must be physically present at the target property (i.e., shipping address) to receive objects that cannot fit in conventional mail slots. Delivery timing is often difficult to track and tends to fall during business hours; therefore, it can be difficult and inconvenient for people to be at the target property at the correct moment. Even if physically present at the property, people may be unable to meet the delivery person at the door for reasons such as, for example, not hearing the doorbell, having a physical disability, or otherwise being occupied or unwilling to greet the delivery person. Additionally, if someone is unaware that a delivery has taken place or is not at the property, theft of delivered objects can be an issue.

Delivery doors that can be unlocked remotely (e.g., via the internet) by the intended recipient have been conceived; however, the operation of such doors requires the attention and active participation of the recipient.

It is thus desirable to develop improved delivery doors and/or delivery systems.

SUMMARY

Described are delivery doors and systems for allowing object deliveries and returns to and from the inside of a private property without physical assistance from someone with access to the property.

In one aspect, provided is an electronic delivery door for permitting passage of an object between an interior and an exterior of a structure through an opening defined in the structure, the delivery door comprising: a door panel; a hinge assembly including: one or more hinges for securing the door panel within the opening of the structure and for permitting the door panel to move between a closed position and an open position by rotation of the one or more hinges, wherein: in the closed position, the opening is covered by the door panel; and in the open position, the one or more hinges have been rotated to permit passage of objects through the opening; and an electronic security device configured to selectively permit opening of the door panel.

In an implementation, the electronic security device includes or is in communication with a barcode scanner and is configured to permit movement of the door panel when the barcode scanner detects a valid barcode.

In another implementation, the electronic security device includes or is in communication with a proximity sensor and is configured to permit movement of the door panel when the proximity sensor detects an authenticated electronic device within a pre-determined proximity to the sensor.

In yet another implementation, the electronic security device includes or is in communication with a security keypad and is configured to permit movement of the door panel when a valid security code is entered on the security keypad.

In yet another implementation, the electronic security device is communicatively coupled to at least one authorized computing device across a network and is configured to permit movement of the door panel in response to a command received from the at least one authorized computing device.

In yet another implementation, the door panel comprises first and second door leaves.

In yet another implementation, the one or more hinges include first and second hinges for securing the first and second door leaves, respectively, within the opening of the structure.

In yet another implementation, the first and second hinges are configured to be positioned coaxially to one another to secure the first and second door leaves within the opening of the structure and being rotatable in opposite directions, wherein, when the delivery door is in the closed position, the first and second door leaves abut one another in a face-to-face configuration such that the first door leaf forms at least a majority of an exterior surface of the delivery door and the second door leaf forms at least a majority of an interior surface of the delivery door.

In yet another implementation, the first and second hinges are integrated as a double action hinge.

In yet another implementation, the first door leaf includes a recess for receiving the second door leaf when the delivery door is in the closed position.

In yet another implementation, the one or more hinges include: a first hinge for securing one end of the first door leaf to a lower surface of the opening of the structure; and a second hinge for operably coupling the second door leaf to an opposite end of the first door leaf, wherein, when the electronic delivery door is in the closed position, opposing transverse ends of the first and second door leaves abut one another.

In yet another implementation, the hinge assembly further comprises a sliding hinge connected to the first and second door leaves for guiding movement of the second door leaf relative to the first door leaf.

In yet another implementation, the hinge assembly further comprises a rotating hinge for enabling the door panel to rotate about an axis extending through a midpoint of the opening.

In yet another implementation, the hinge assembly includes a motorized mechanism for rotating the at least one of the hinges by one or more pre-determined amounts.

In yet another implementation, the motorized mechanism is a rotatable mechanism provided within the hinge.

In yet another implementation, the one or more pre-determined amounts of hinge rotation are based at least in part on object dimension information and/or security settings.

In yet another implementation, the object dimension information is received by the electronic security device.

In yet another implementation, the security settings are stored by the electronic security device and can be adjusted by an owner of the electronic delivery door.

In yet another implementation, the opening is defined within a standard door for residential homes, condos, apartments or office buildings.

In yet another implementation, the opening is defined within a wall of a structure.

In another aspect, provided is an electronic delivery system for permitting exchange of objects between an interior and an exterior of a structure through a doorway defined in the structure, the system comprising: a door secured within the doorway; a hinge assembly including: one or more hinges for securing the door within the doorway and for permitting the door panel to move between a closed position and an open position by rotation of the one or more hinges, wherein: in the closed position, the doorway is covered by the door; and in the open position, the one or more hinges have been rotated to permit passage of objects through the opening; and an electronic security device configured to selectively permit opening of the door panel.

In an implementation, the electronic security device includes or is in communication with a doorstop assembly having a first end removably attachable to an interior surface of the door and a second end configured to engage an anchoring mechanism attachable to an interior of the structure, wherein a string extends between the first and second ends, the doorstop assembly further comprising a doorstop mechanism that can act on the string to selectively permit the door to open by predetermined amounts.

In another implementation, the electronic security device includes or is in communication with at least one of the hinges.

In yet another implementation, the electronic security device includes or is in communication with a barcode scanner and is configured to permit movement of the door when the barcode scanner detects a valid barcode.

In yet another implementation, the electronic security device includes or is in communication with a proximity sensor and is configured to permit movement of the door when the proximity sensor detects an authenticated electronic device within a pre-determined proximity to the sensor.

In yet another implementation, the electronic security device includes or is in communication with a security keypad and is configured to permit movement of the door when a valid security code is entered on the security keypad.

In yet another implementation, the electronic security device is communicatively coupled to at least one authorized computing device across a network and is configured to permit movement of the door in response to a command received from the at least one authorized computing device.

In yet another implementation, a security device includes or is in communication with weight sensors and is configured to halt all functionality or close the electronic delivery door when an unauthenticated object is detected by the weight sensors.

BRIEF DESCRIPTION OF THE DRAWINGS

Embodiments will now be described with reference to the appended drawings wherein.

DETAILED DESCRIPTION

Figure 2:
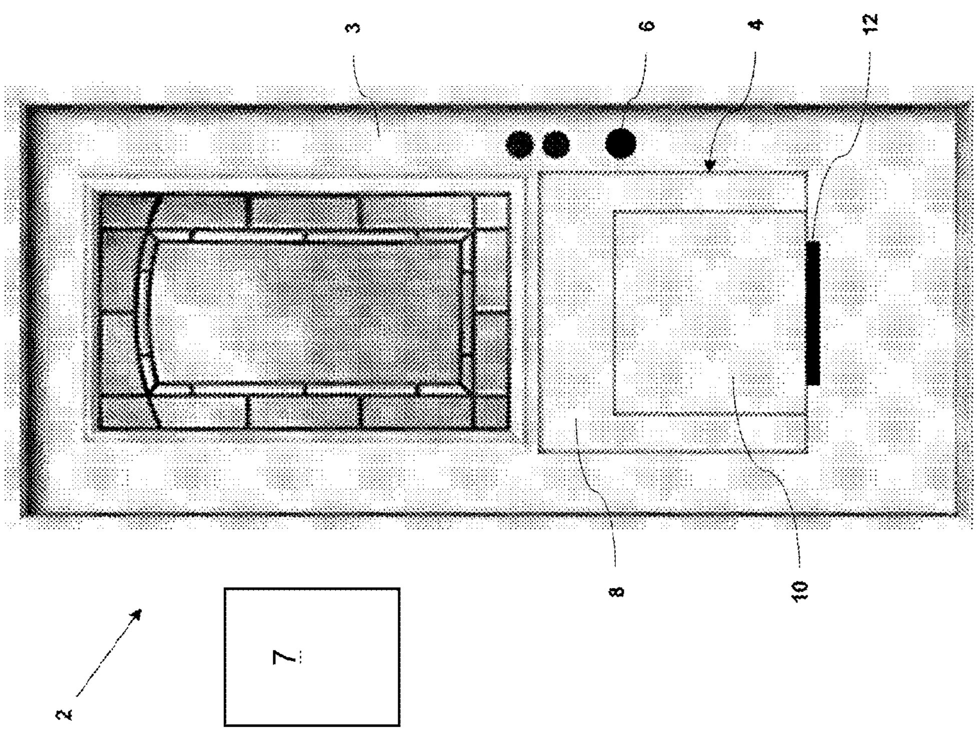
FIG. 2 is a rear view of the electronic delivery door shown in FIG. 1.
Figure 1:
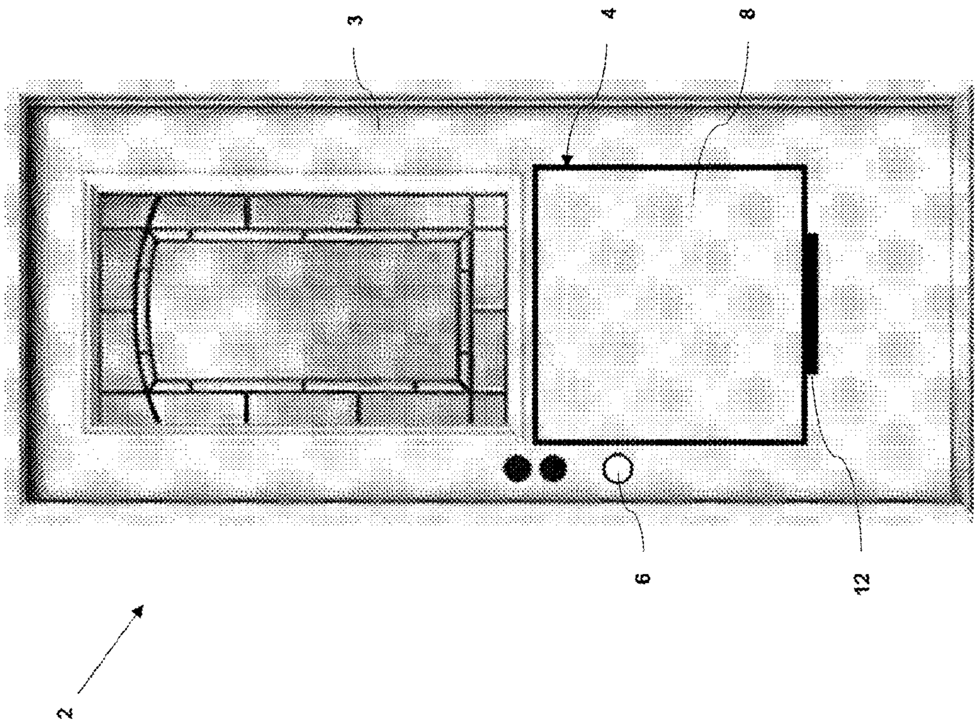
FIG. 1 is a front view of an example embodiment of an electronic delivery door having first and second door leaves secured by a double action hinge within an opening in a residential door.
Figure 3:
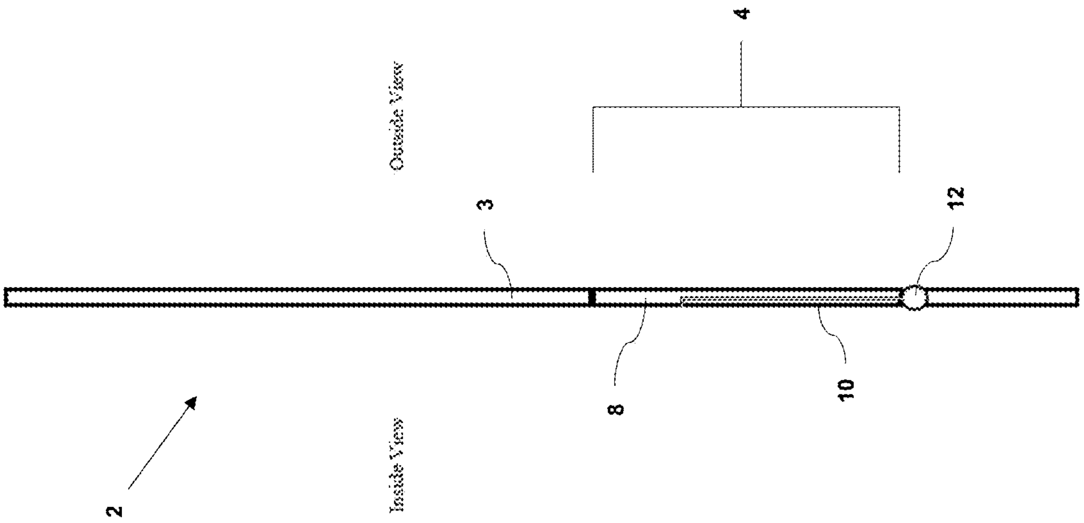
FIG. 3 is a side view of the electronic delivery door shown in FIGS. 1 and 2, the delivery door being shown in a first, or closed position.

One or more of the terms "front", "back", "rear", "vertical", "vertically", "horizontal", "horizontally", "top", "bottom", "upwardly", "downwardly", "inwardly", "outwardly", "upper", "lower", "right" and "left" are used throughout this specification. It will be understood that these terms are not intended to be limiting. These terms are used for convenience and to aid in describing the features herein, for instance as illustrated in the accompanying drawings.

The following electronic delivery doors and systems may enable delivery to and retrieval from an interior of a private property without physical assistance from someone with access to the property. More particularly, the delivery doors and systems of the present disclosure may provide a non-invasive and efficient solution for deliveries and returns of packages to properties including, but not limited to, residential homes, offices, and factories.

While the example embodiments of electronic delivery doors and systems illustrated in the Figures are shown in the context of residential doors, the delivery systems and doors of the present disclosure may also be implemented in any other suitable context such as, for example, garage doors, windows, outside walls, or façades of properties including, but not limited to, houses, condos, apartments, offices, and factories.

The delivery doors and systems may comprise an electronic security device including or having access to an electronic authorization device such as, for example, a barcode scanner. The use of such a security device, in combination with the delivery door mechanisms described below, may enable deliveries to be performed without physical involvement, or without any involvement, of an authorized recipient (i.e., named recipient/customer, family member of named recipient, property owner, tenant, resident, etc.). The delivery doors and systems described herein may thus benefit customers by obviating the need for them to be actively involved in order to receive or return purchases and may also benefit companies by enabling improved delivery efficiency and reduced delivery/return costs; and, additionally, may reduce or eliminate the occurrence of theft of delivered objects when nobody is present to receive them.

FIGS. 1-5 illustrate an example embodiment of an electronic delivery system 2 comprising a residential door 3 which includes an electronic delivery door assembly 4. The electronic delivery door assembly 4, which may be referred to as an "e-door assembly" 4, comprises a door panel which, in this example embodiment, is made up of first and second door leaves (8,10). The e-door assembly 4 also comprises a hinge assembly 12. The first and second door leaves (8,10) may be fastened to the residential door 3 (i.e., within an opening in the residential door 3) by the hinge assembly 12. The hinge assembly 12 is motorized in this example embodiment, and its operation is controlled by a security device (not shown) that includes or is in communication with a barcode scanner 6. The hinge assembly 12 may be a dual action hinge, and may enable rotation in opposite directions of the first and second door leaves (8,10) to at least partially open the door panel to enable passage of objects through the opening. The first door leaf 8 may face toward the outside (i.e., toward a delivery person), and the second door leaf 10 toward the inside of the property. The e-door assembly 4, minus the barcode scanner 6, is shown in isolation in FIG. 6.

Figure 6:
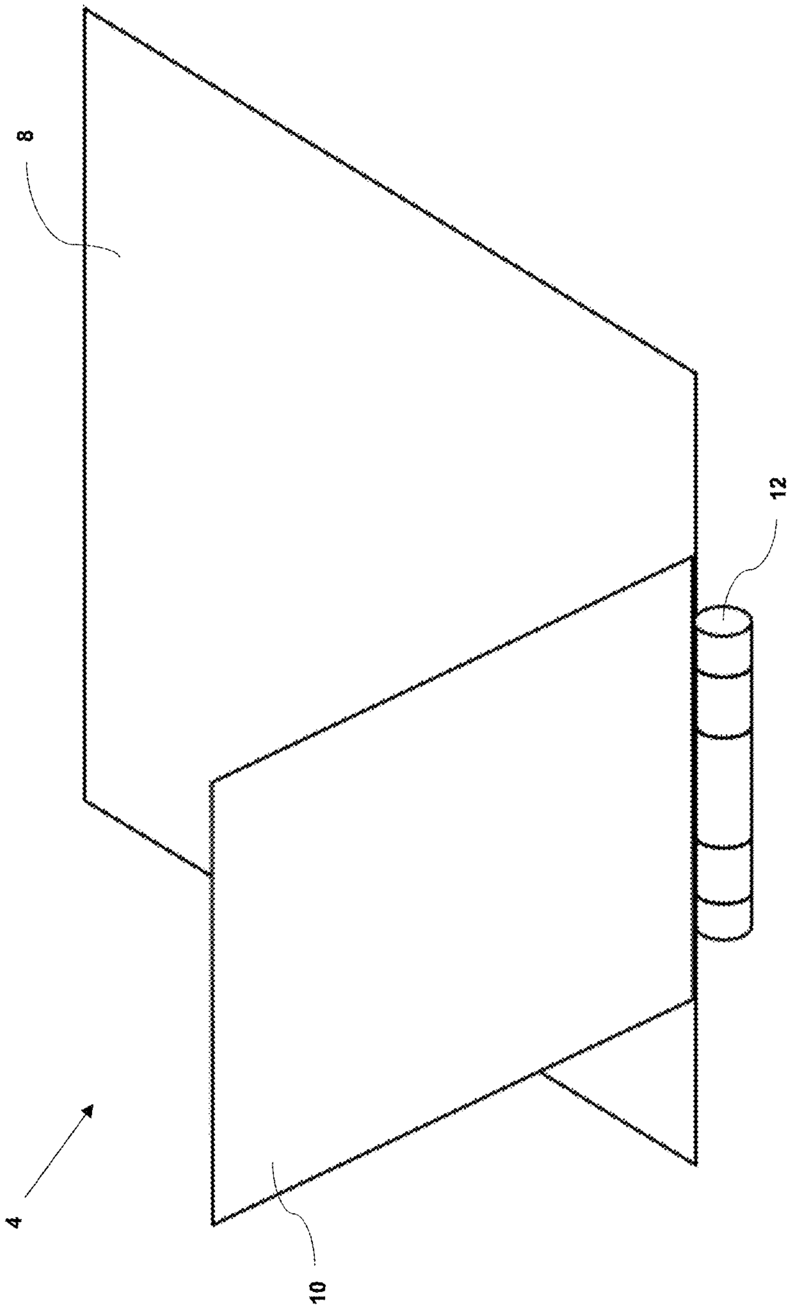
FIG. 6 is a perspective view of the electronic delivery door of FIGS. 1-5, the delivery door being shown in isolation.
Figure 7:
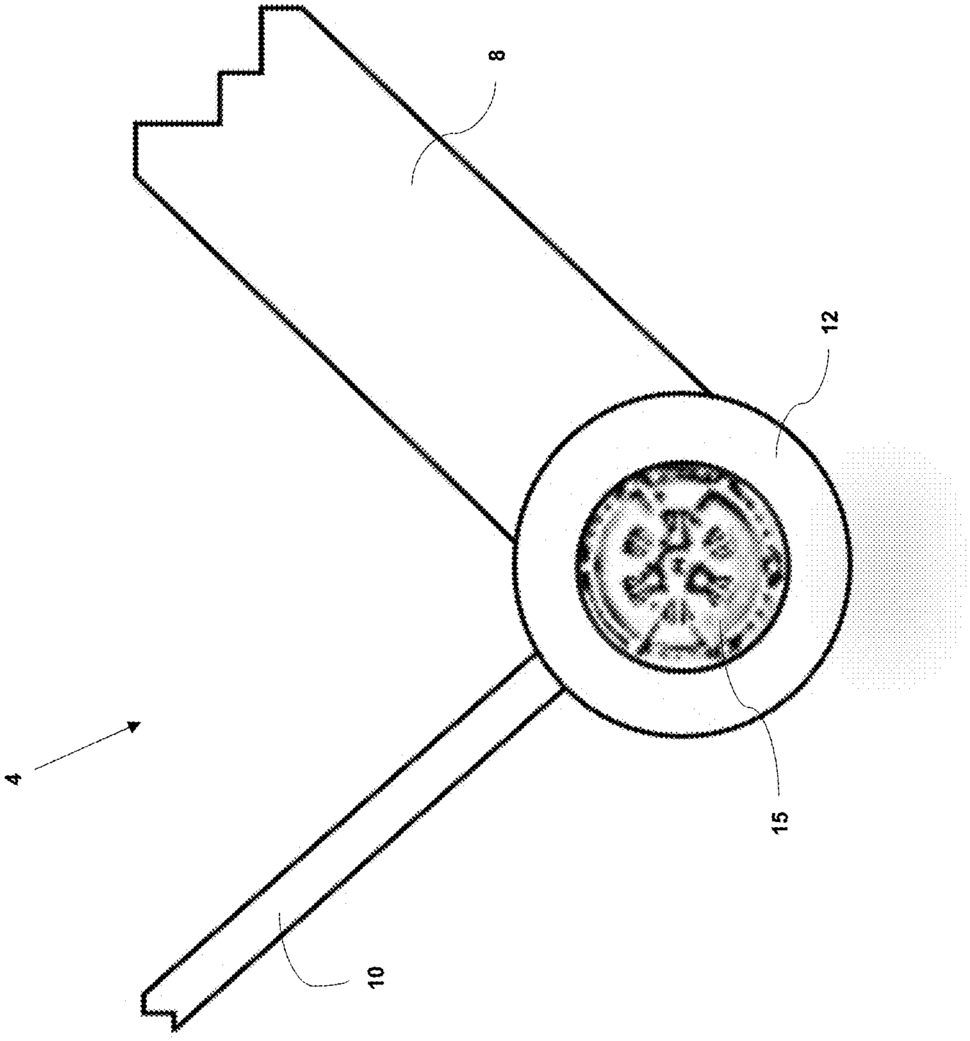
FIG. 7 is a side view of the electronic delivery door shown in FIG. 6.
Figure 8:
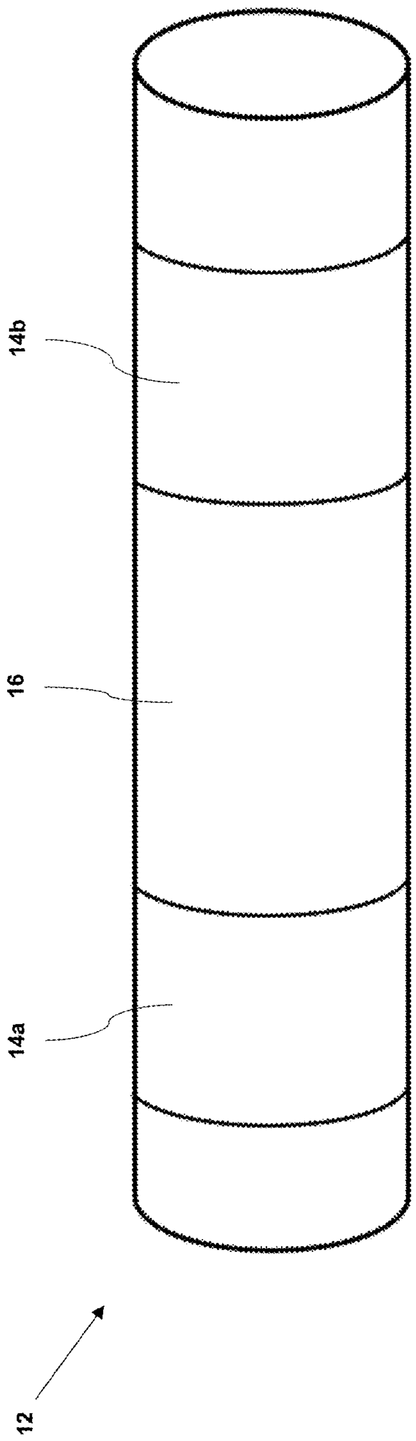
FIG. 8 is a front view of the motorized hinge assembly best depicted in FIG. 7.
Figure 10:
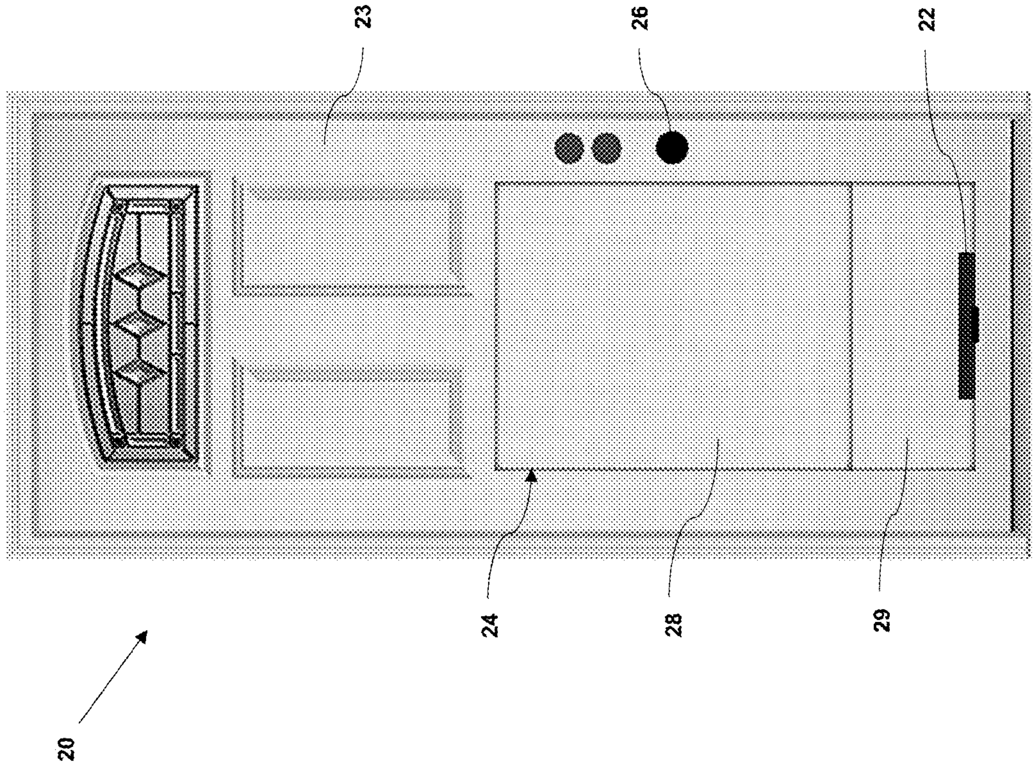
FIG. 10 is a rear view of the electronic delivery door shown in FIG. 9.
Figure 9:
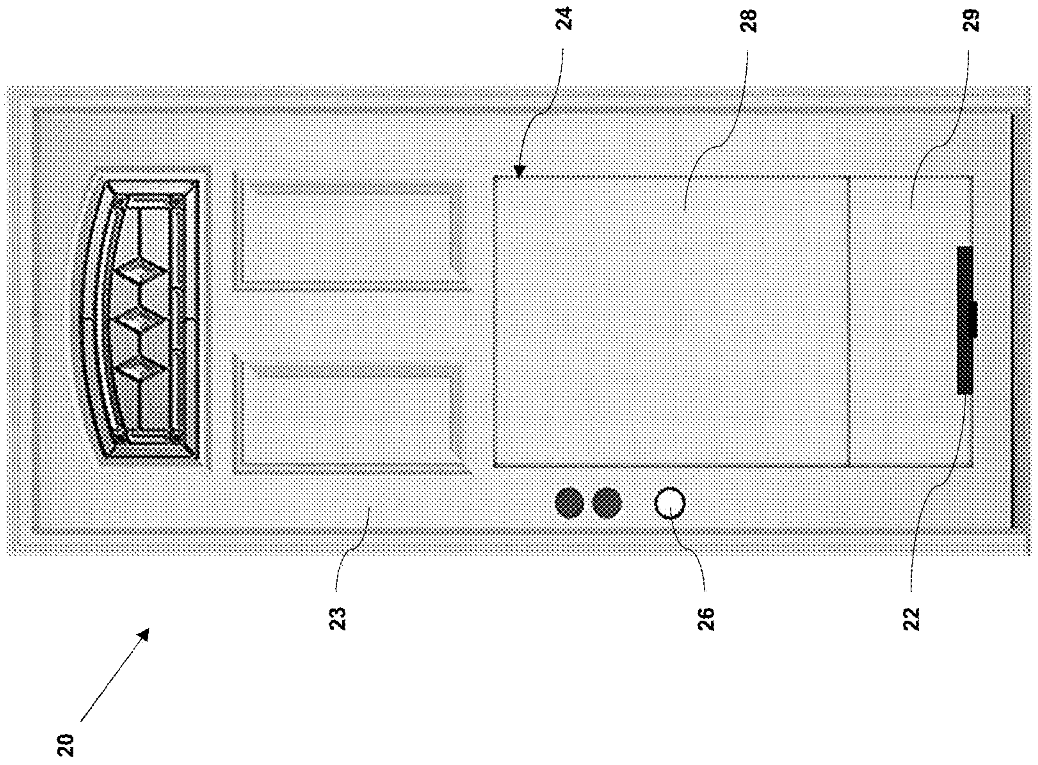
FIG. 9 is a front view of another example embodiment of an electronic delivery door having first and second door leaves secured within an opening in a residential door, wherein, in a first operation mode, a sliding hinge is provided to control the movement of the second door leaf relative to the first door leaf, and in a second operation mode, the first and second door leaves are rotatable together about a central axis of the opening.

FIGS. 6 and 7 illustrate the hinge assembly 12 in greater detail. The hinge assembly may comprise first and second hinges (14*a*, 14*b*) for the first door leaf 8, and another hinge 16 for the second door leaf 10. Depicted in FIG. 7 is a motorized mechanism 15 within the hinge assembly 12 which may rotate the hinges and thus open and close the door panel.

In operation, a delivery driver can scan a barcode, located on an object to be delivered (e.g., a box, parcel, etc.), using the barcode scanner 6. This may activate the motorized hinge assembly 12, thereby opening the door panel. The first and second door leaves (8,10) may swing open in opposite directions by pre-determined amounts such as, for example, 45 degrees. The e-door 4 may then be in the position shown in FIG. 4, whereby a V-shaped receptacle is created by the door leaves (8,10) into which a delivery person may place the scanned object.

In some embodiments, the electronic security device may include or be in communication with a weight-sensor within the door panel or the hinge assembly 12 to detect when the object has been deposited. If the weight sensor detects an object, the second door leaf 10 may swing further open by, for example, 90 degrees, resulting in the door panel position shown in FIG. 5. In this configuration, the delivered object may slide down the second door leaf 10 into the property and/or may be pushed through by the delivery person. Then, the door leaves (8,10) may automatically return back toward their original states. That is, in this example embodiment, the first door leaf 8 may swing 45 degrees and the second door leaf 10 may swing 135 in the opposite direction, thus returning both of the door leaves (8,10) to their starting points (i.e., in parallel with the door 3). The e-door 4 may then be locked.

Figure 4:
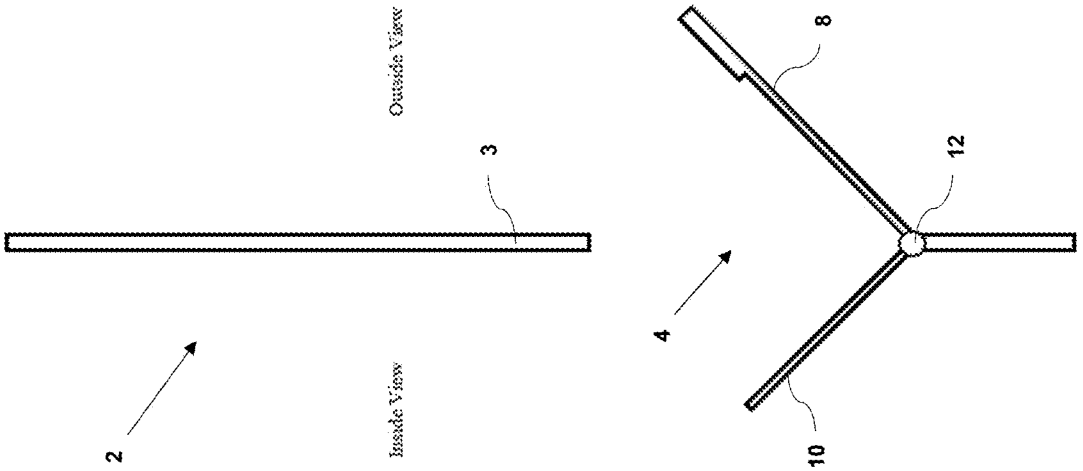
FIG. 4 is a side view of the electronic delivery door shown in FIGS. 1-3, the delivery door being shown in a second, or partially open position.
Figure 5:
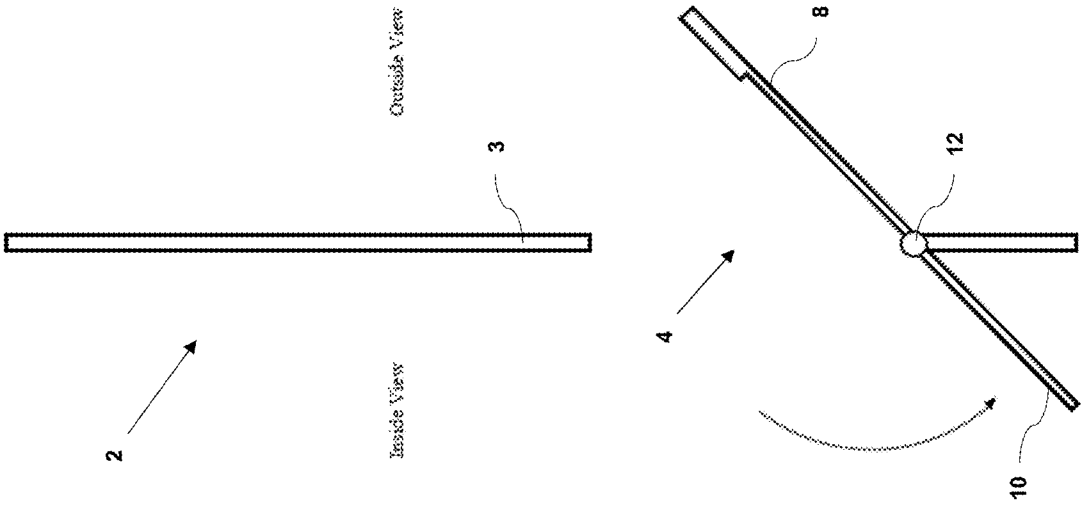
FIG. 5 is a side view of the electronic delivery door shown in FIGS. 1-4, the delivery door being shown in a third position, or fully open position.

In alternative embodiments, the V-shaped receptacle shown in FIG. 4 may alternatively rotate into the opening to drop the object therein while providing the delivery person with less access to the opening as compared to the configuration shown in FIG. 5. This may be enabled by an additional set of hinges that may be activated by, for example, a button or a weight sensor in communication with the security device.

In some embodiments, the system 2 may include a safety mechanism to detect a hindrance, such as a child or pet, in the potential landing zone of the object as it slides from the second door leaf 10. For example, the second door leaf 10 may stop moving or even slowly swing upwards to prevent the object from falling at least until the hindrance is no longer detected. The system 2 may comprise an electronic lock, or "e-lock" (not shown) for locking the door 3. The e-lock may be disabled during operation of the e-door to mitigate the risk of a someone (e.g., a delivery person) from reaching inside and unlocking the door 3. Furthermore, the weight-sensor at the bottom of V-shaped opening may be set at a limit that prevents a human from passing through the opening. These additional safety/security features and variations thereof may be included alone or in combination in any of the electronic delivery doors and systems described herein.

Alternatively or in addition to barcode scanners, other electronic authentication devices may be included in or in communication with the electronic security device to initiate operation of the e-doors and systems described herein. Such authentication devices may include, but are not limited to, electronic security keypads, wireless authentication devices and electronic proximity sensors.

The extent of opening of the door panel and/or the required weights for operation of the e-doors and systems of the present disclosure may be pre-determined and/or may be dictated by object information received by the security device from the electronic authentication device(s).

FIGS. 9-13 illustrate another example embodiment of an electronic delivery system 20 comprising a door 23 including an e-door assembly 24. First and second door leaves (28,29), forming a door panel, may be secured together by a simply hinge (not shown) and a sliding hinge 27 (collectively "sliding hinge assembly" 27), the operation of which may be driven by a motorized hinge 22 securing the second door leaf 29 to the door 23 at the bottom of the opening therein. The aforementioned hinges may be referred to collectively as a hinge assembly.

A delivery driver, on approaching the door 23, may press one of two buttons (not shown) for first and second delivery operations, respectively, in accordance with delivery instructions. After pressing one of the buttons, the delivery driver may scan a barcode on the object to be delivered, thereby initiating operation of the e-door assembly 24. The mode of operation may also be automatically determined by an electronic security device 7 that includes or is in communication with the barcode scanner, based on the information collected from the barcode. The electronic security device may control operation of the motorized hinge 22.

Figure 11:
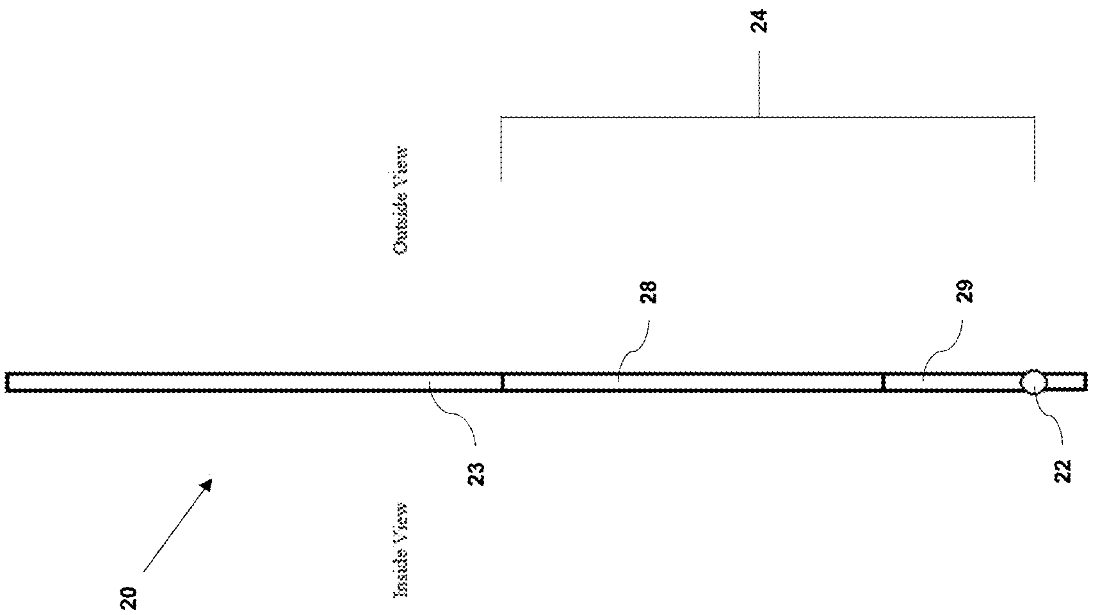
FIG. 11 is a side view of the electronic delivery door shown in FIGS. 9 and 10, the delivery door being depicted in a first, or closed position.
Figure 12:
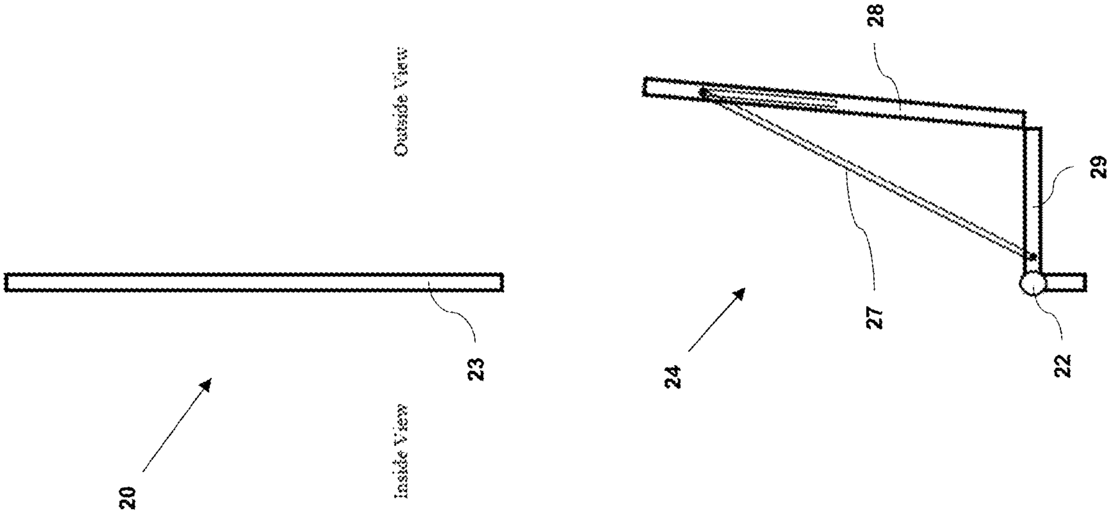
FIG. 12 is a side view of the electronic delivery door shown in FIGS. 9-11, the delivery door being depicted in a first open position.

If the delivery driver activates the first delivery operation, then the second door leaf 29 may swing outwardly by a pre-determined amount such as, for example, 90 degrees, thereby opening the door panel. The motorized hinge 22 having a motorized mechanism 25 (FIG. 15) provided therein may drive the rotation of the second door leaf 29, which in turn drives the movement of the first door leaf 28 which is connected thereto by the sliding hinge assembly 27. Closed and opened positions of the e-door assembly 24 are shown in FIGS. 11, and 12, respectively.

The extent to which the e-door assembly 24 opens can be controlled by the degree of rotation of the motorized hinge 22 and also by the design of the sliding hinge assembly 27. The sliding hinge assembly 27 may optionally move the first door leaf 28 into several positions relative to the first door leaf 29. The sliding hinge assembly 27 may include sliding hinges on one or both sides of the door panel.

Once the e-door 24 is in an open position, the delivery driver may place the object to be delivered on the second door leaf 29. There may optionally be weight sensors on or within the second door leaf 29 or motorized hinge 22. When the weight sensors detect a weight within a pre-determined range or near an amount dictated by the electronic security device after collecting object information, the e-door 24 may begin to close. The closing motion may push or slide the object through the opening to an interior of the property/structure. When the door panel is closed, the e-door assembly 24 may return to being locked.

Figure 13:
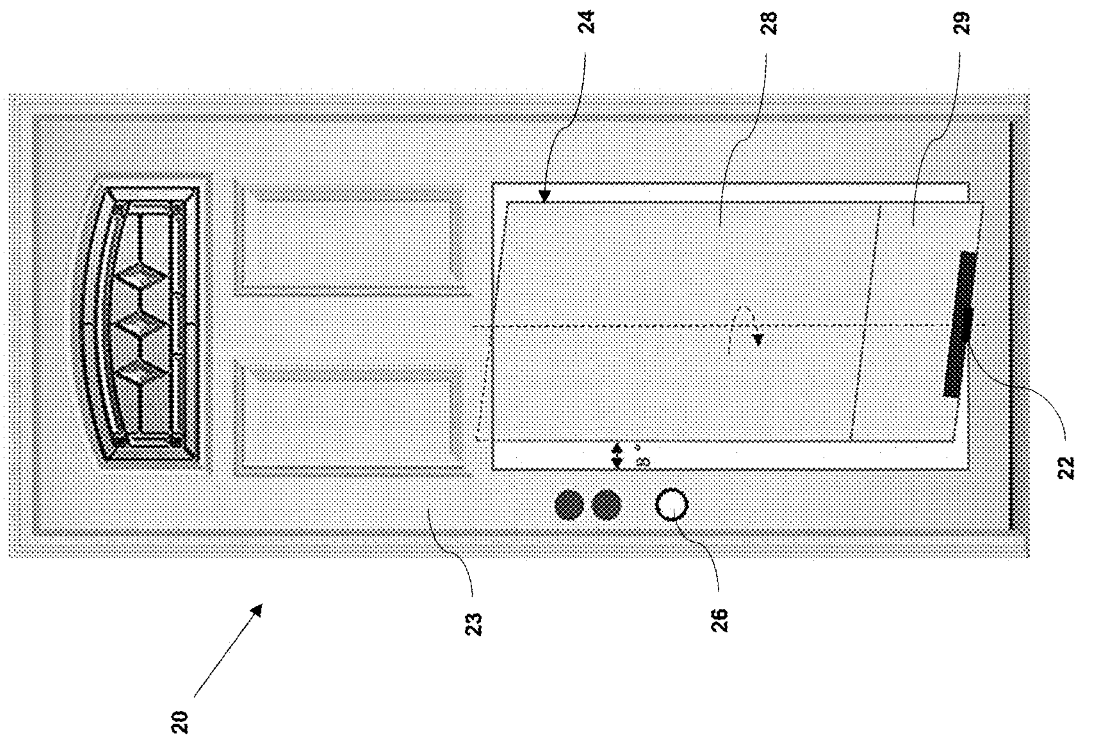
FIG. 13 is a front view of the electronic delivery door shown in FIGS. 9-12, the delivery door being depicted in a second open position.
Figure 14:
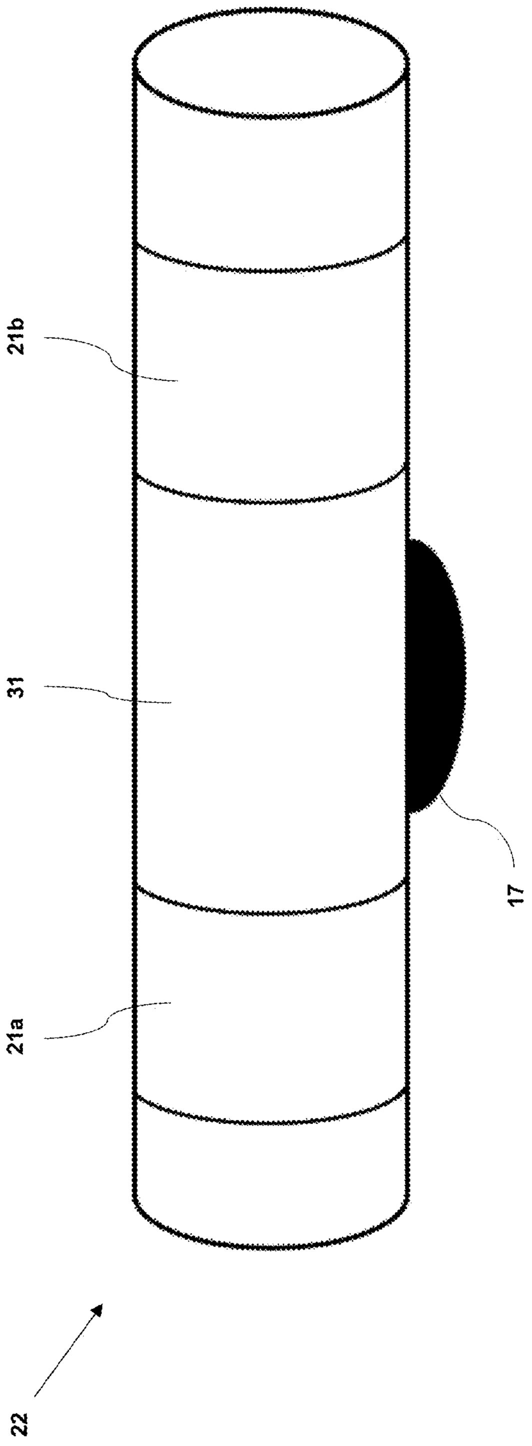
FIG. 14 is a front view of the motorized hinge assembly shown in FIGS. 9-13.
Figure 15:
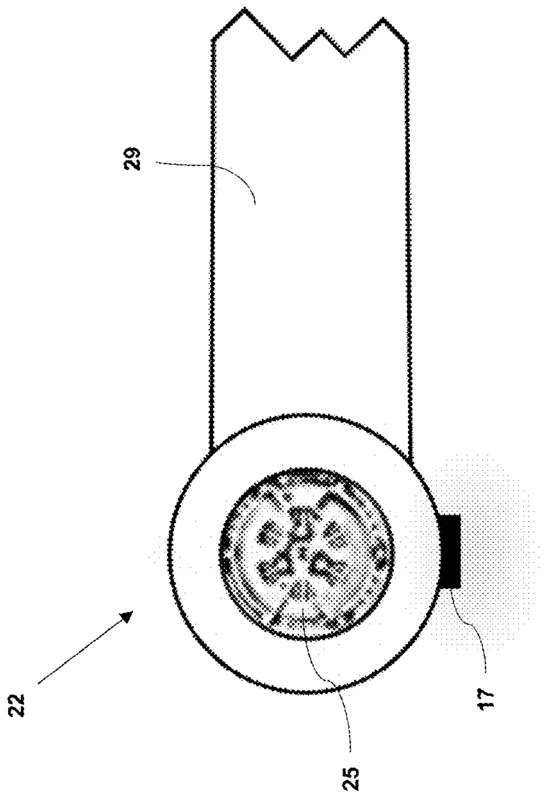
FIG. 15 is a side view of the motorized hinge assembly best depicted in FIG. 14.
Figure 17:
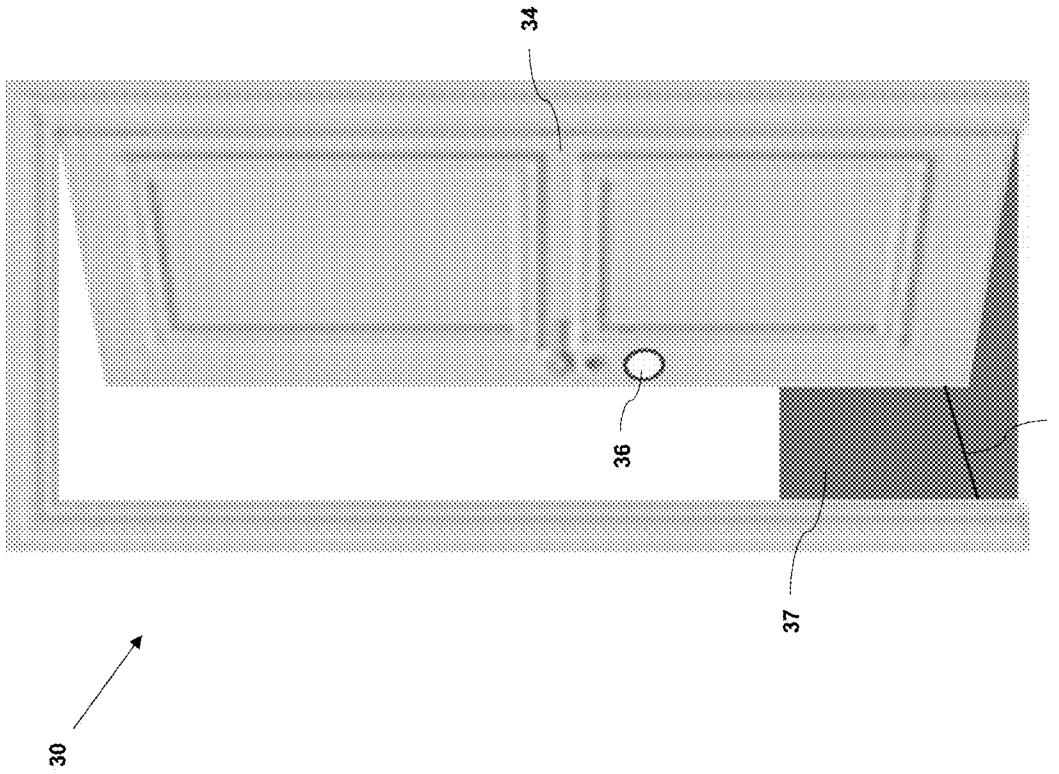
FIG. 17 is a front view of the electronic delivery system shown in FIG. 16, the delivery door being depicted in a partially open position.
Figure 16:
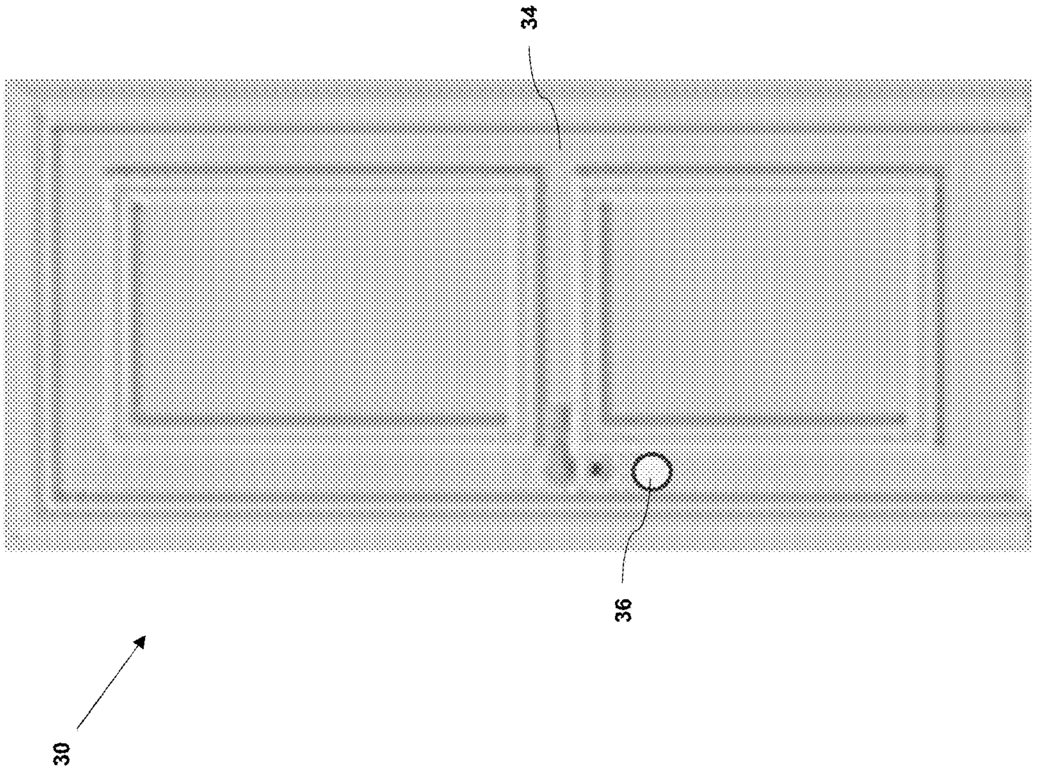
FIG. 16 is a front view of an example embodiment of an electronic delivery system comprising a delivery door, a motorized hinge assembly, and at least one weight activated sensor.
Figure 18:
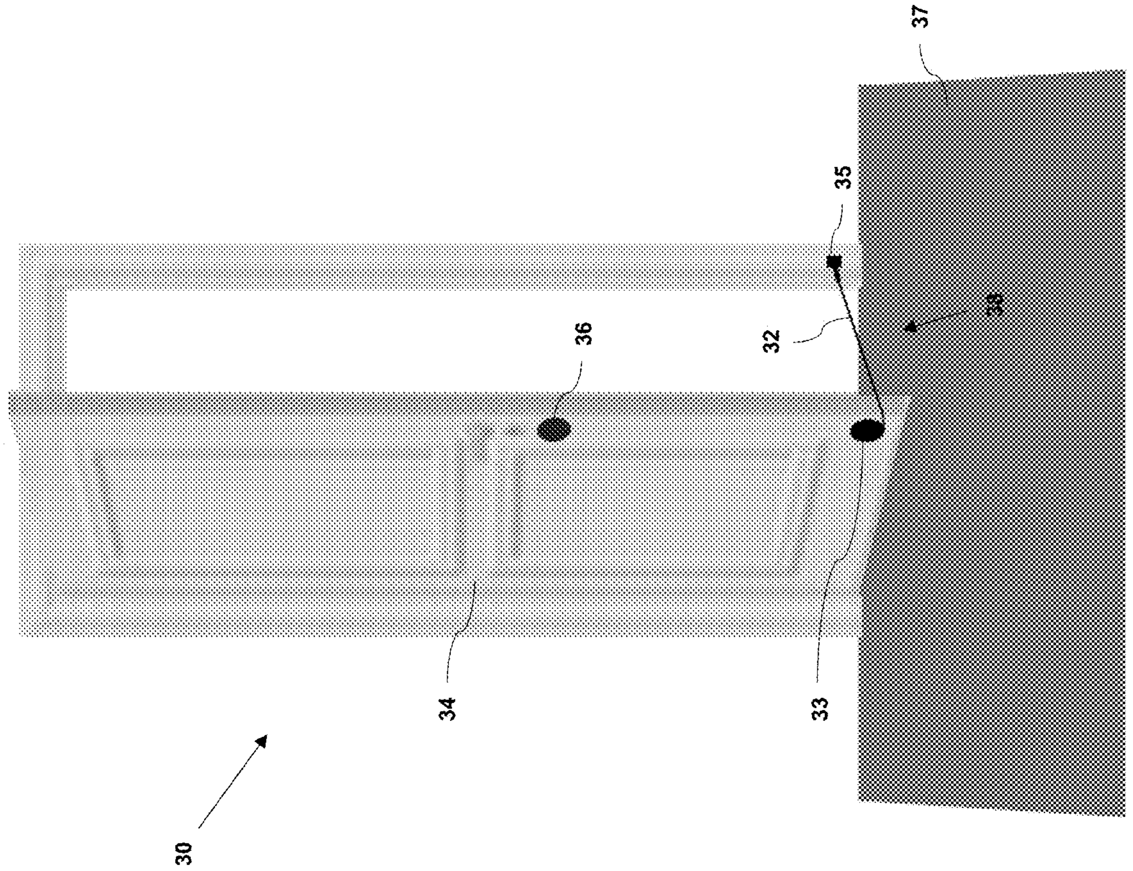
FIG. 18 is a rear view of the electronic delivery system shown in FIG. 17.

Turning to FIGS. 13-15, if the second delivery operation is activated by the driver, an embedded electronic rotor 17 may rotate the door panel (i.e., the door leaves (28,39) together) along with the hinge assembly. The electronic rotor 17 may be connected to a stationary component 31 of the motorized hinge 22 (FIG. 14). The stationary component 31 may be positioned between first and second hinges 21*a* and 21*b* for securing the second door leaf 29 within the opening.

The electronic rotor 17 may rotate the door panel by a pre-determined amount in either direction. In one example embodiment, the electronic rotor 17 may rotate the door panel by 40.7 degrees in the clockwise direction for right-hand inswing door. Taking into consideration the example dimensions in FIG. 13, such rotation may create an 8" horizontal and 40" vertical or 2.22 square foot opening. As mentioned above, the pre-determined amount of rotation (and, in turn, the opening size) may vary based on, for example, object information received by the security device (not shown) from the electronic authentication device (in this case a barcode scanner 26) and/or pre-determined settings. In some embodiments, the door panel may remain open for a pre-determined period of time for security purposes.

In alternative example embodiments, the door panel may consist of a single door leaf and the electronic rotor 17 may be mounted at the midpoint of any edge of the opening (i.e., at the bottom, top, or on either side of a square opening).

FIGS. 16-19 illustrate another example embodiment of an electronic delivery system 30. The system 30 comprises an e-door 34, which in this example embodiment is an entire residential door having a barcode scanner 36 embedded therein. The barcode scanner 36 may be included in or in communication with an electronic security device (not shown) that controls a doorstop assembly 38, or "e-doorstop assembly" 38 (see FIGS. 18-20) mounted to the e-door 34. The e-doorstop assembly 38 may comprise a motorized doorstop mechanism 33 including an extendable doorstop wire 32 and hook 39. The system 30 may further comprise an anchor 35 configured to engage the hook 39. In this example embodiment, the anchor 35 is in the form of a hole in the door frame. The system may further comprise an electronic door mat 37 with embedded weight sensors that can be positioned on the floor near the inside facing side of the door 34.

Figure 19:
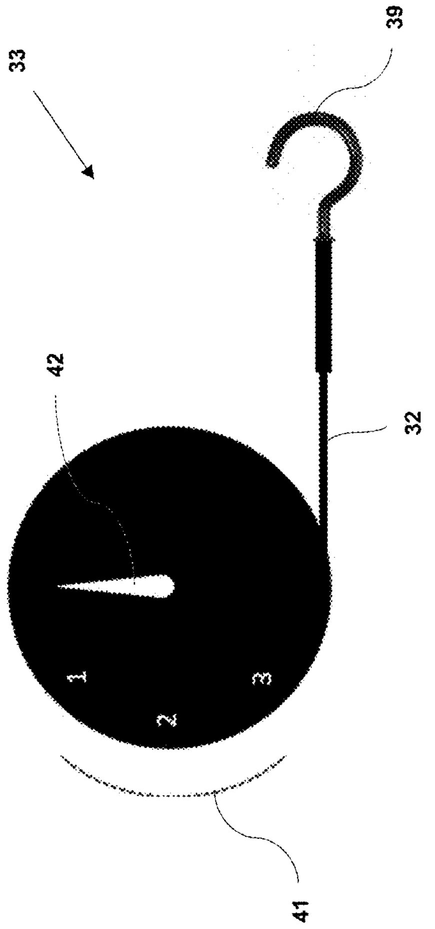
FIG. 19 is a side view of the motorized hinge assembly shown in FIGS. 16-18.
Figure 20:
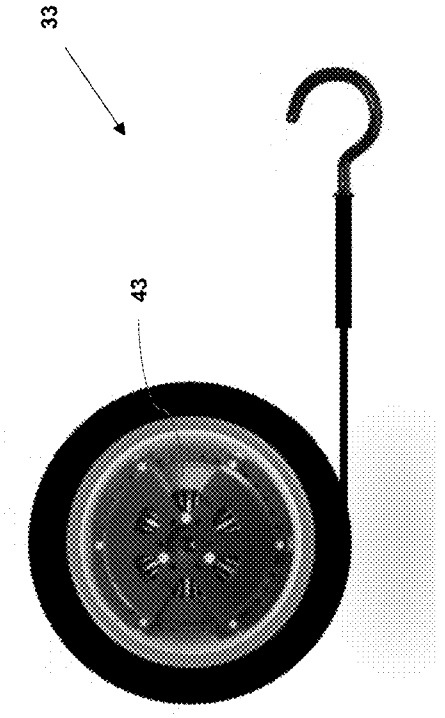
FIG. 20 is a side, cross-sectional view of the motorized hinge assembly best shown in FIG. 19.
Figure 22:
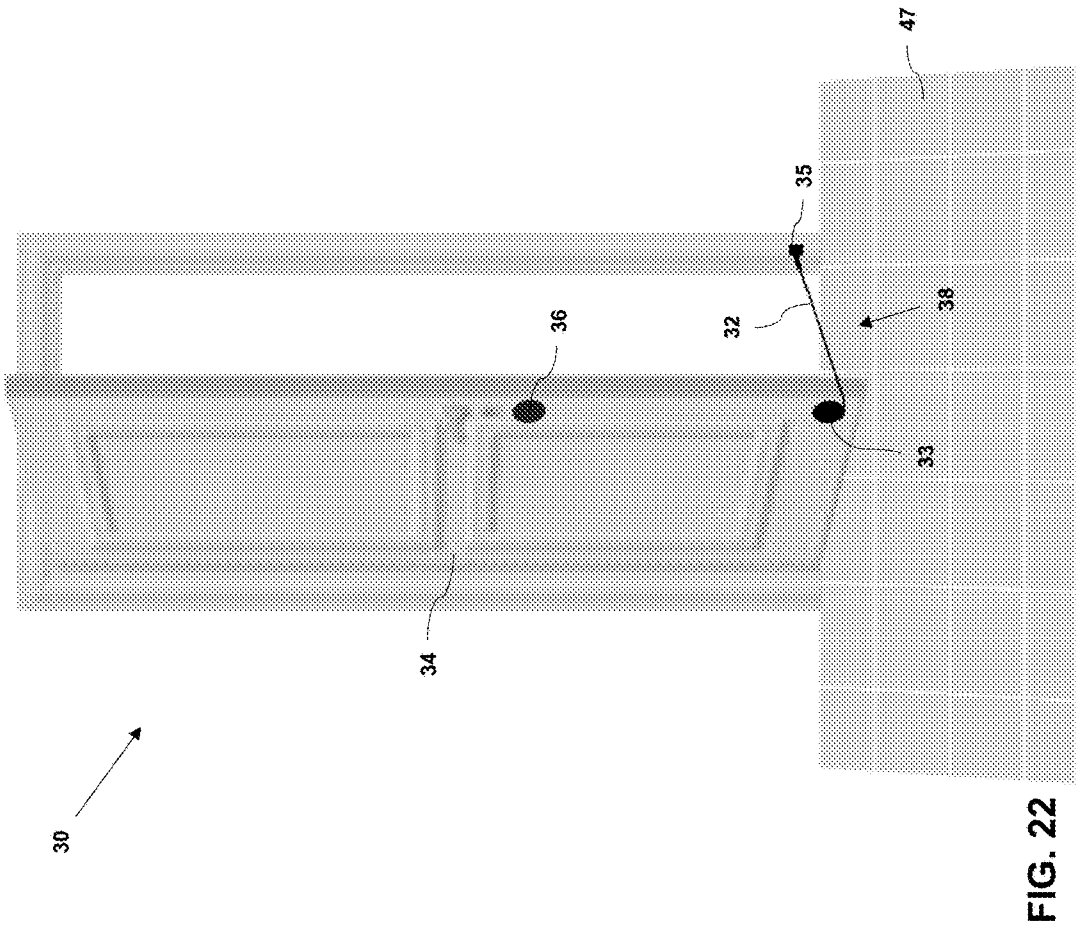
FIG. 22 is a rear view of the electronic delivery system shown in FIG. 21, the delivery door being depicted in a partially open position.
Figure 21:
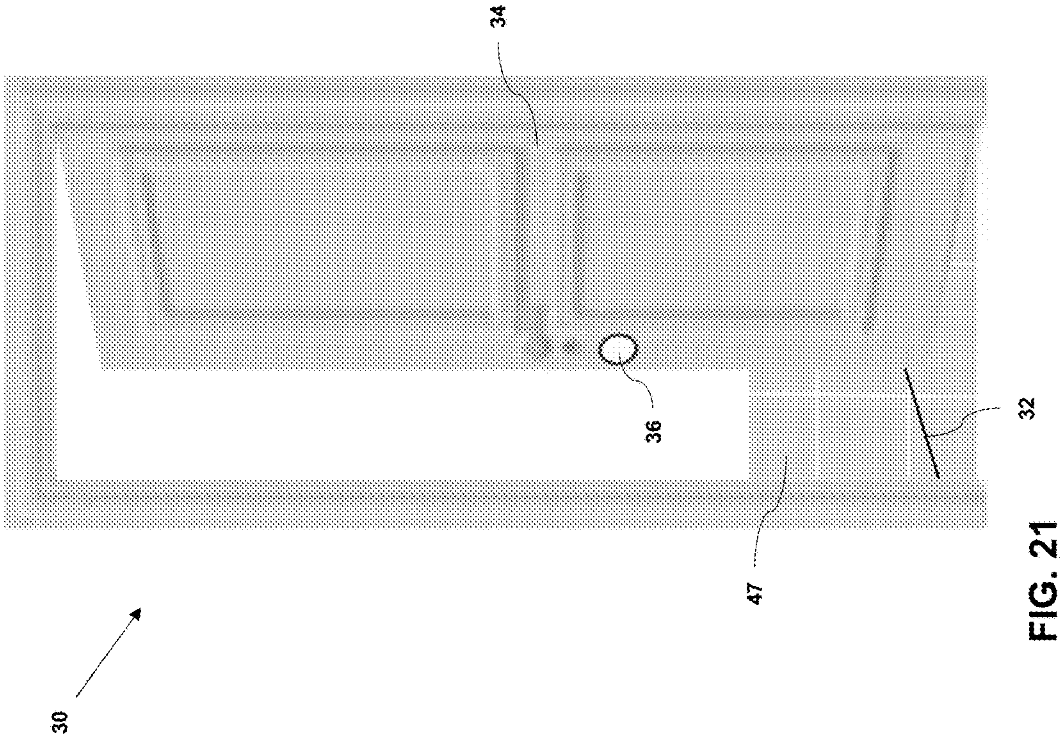
FIG. 21 is a front view of another example embodiment of an electronic delivery system comprising a delivery door, a motorized hinge assembly, and at least one weight activated sensor.

The e-doorstop assembly 38 may be configured to permit the door 34 to open by no more than one or more pre-determined amounts and/or amounts dictated by object information received by the security device from the electronic authentication device(s) (the barcode scanner 36, in this case). The electronic door mat 37 may be in communication with the electronic security device and thus may initiate closing of the e-doorstop assembly 38 a pre-determined amount of time after the mat 37 detects that an object has been placed thereon. The doorstop mechanism 33 may comprise a door-opening position lever 42 and may be configured to open to several extents or levels 41 using incremental position-locking hinges 43 (FIGS. 19 and 20). In alternative embodiments, the electronic door mat 37 may be in the form of weight sensors embedded in the foyer floor (FIGS. 21 and 22).

Figure 24:
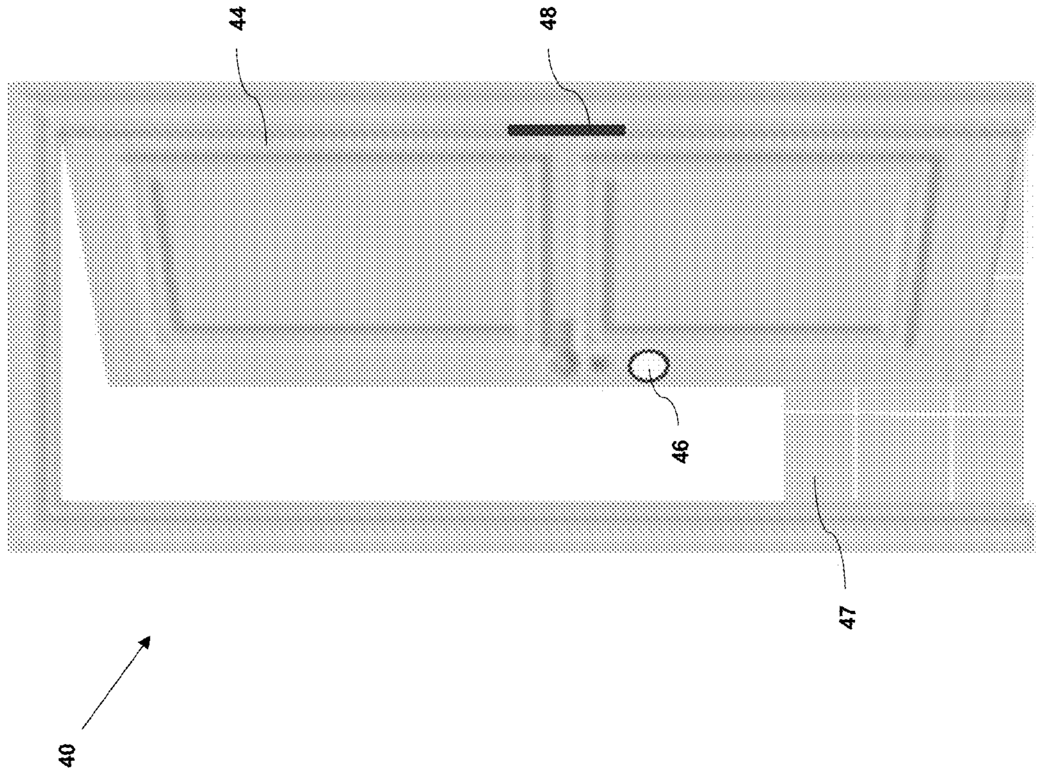
FIG. 24 is a front view of the electronic delivery system shown in FIG. 23, the delivery door being depicted in a partially open position.
Figure 23:
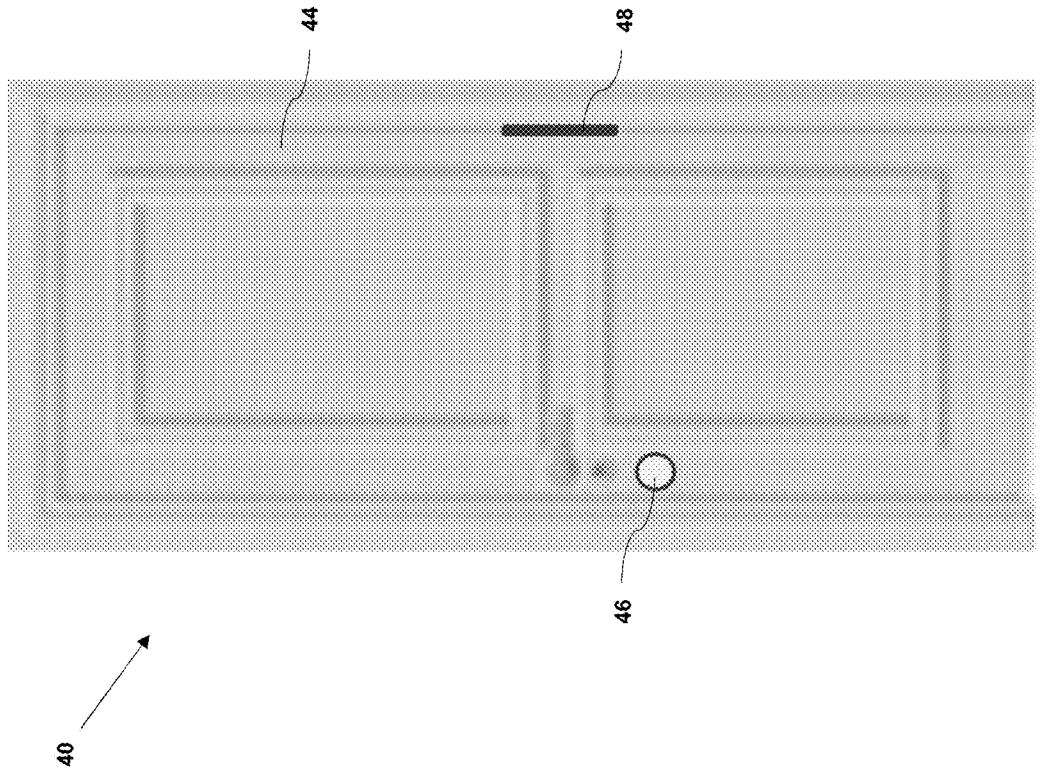
FIG. 23 is a front view of another example embodiment of an electronic delivery system comprising, the system comprising a delivery door, a motorized hinge assembly, and at least one weight activated sensor.
Figure 25:
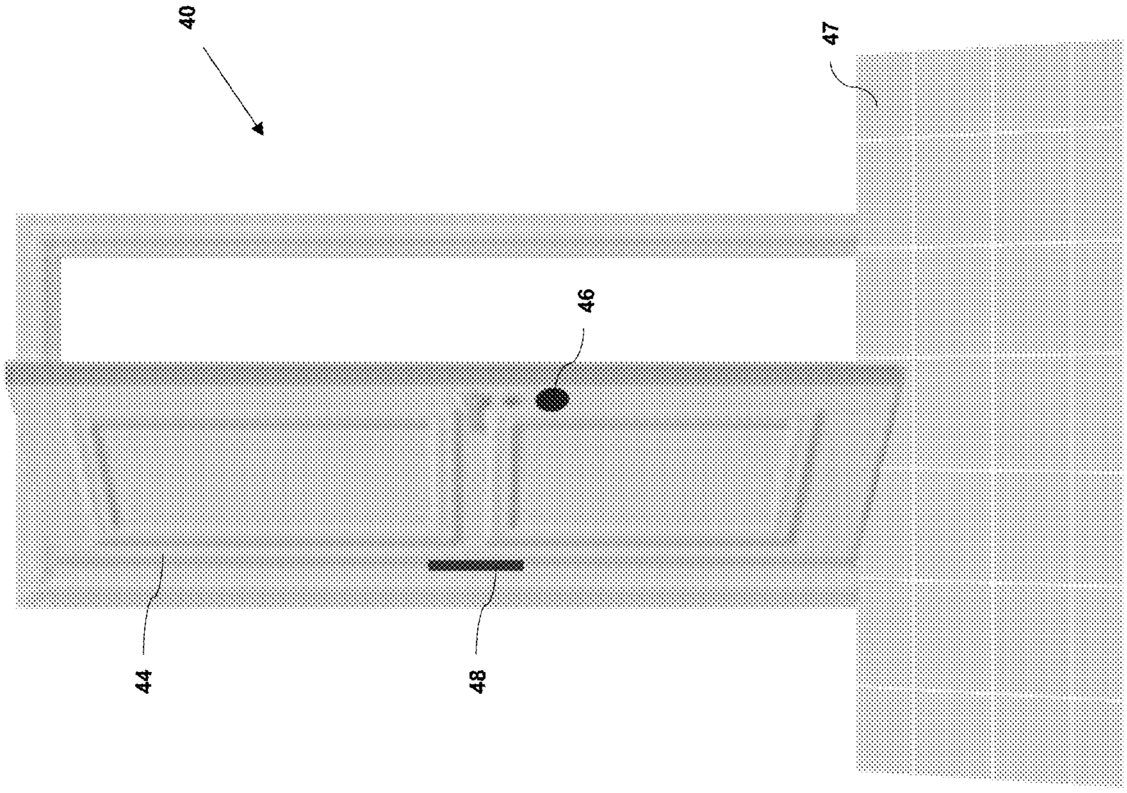
FIG. 25 is a rear view of the electronic delivery system shown in FIG. 24.
Figure 27:
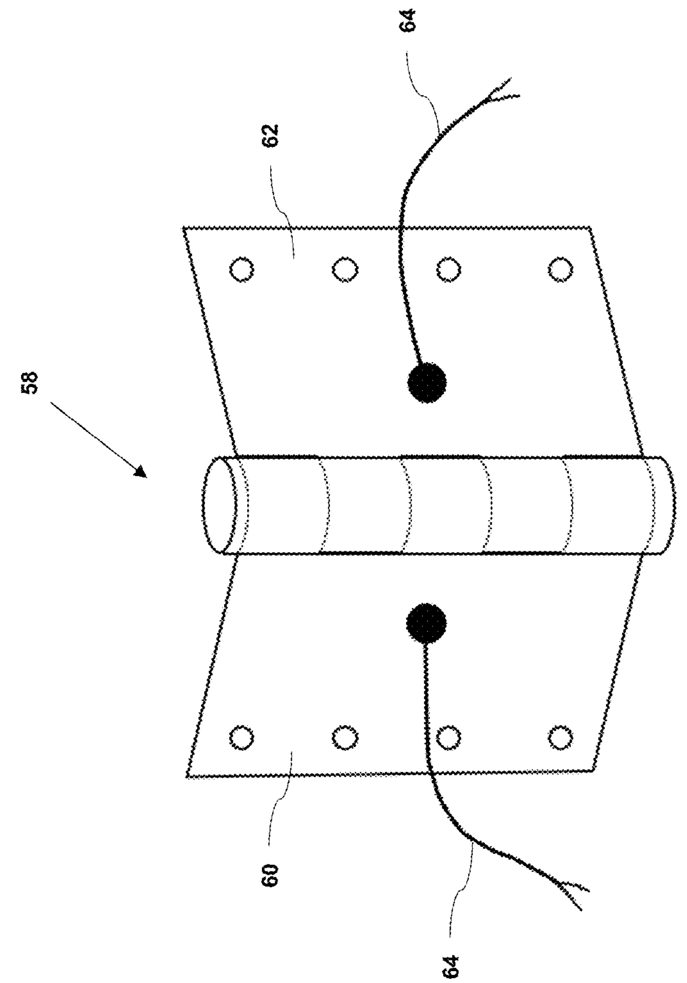
FIG. 27 illustrates another example of a motorized hinge assembly that may replace the assembly shown in FIG. 26.
Figure 26:
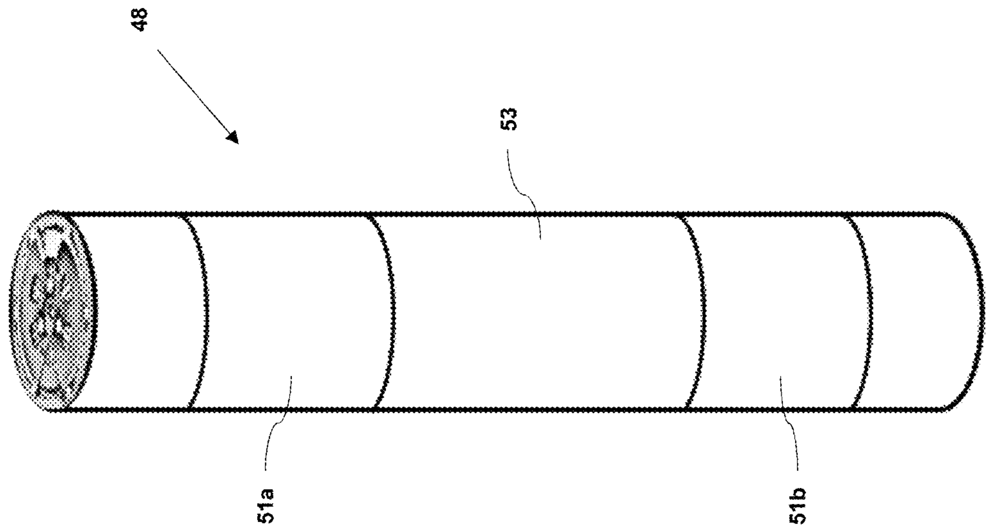
FIG. 26 is a front view of the motorized hinge assembly shown in FIGS. 23-25.
Figure 29:
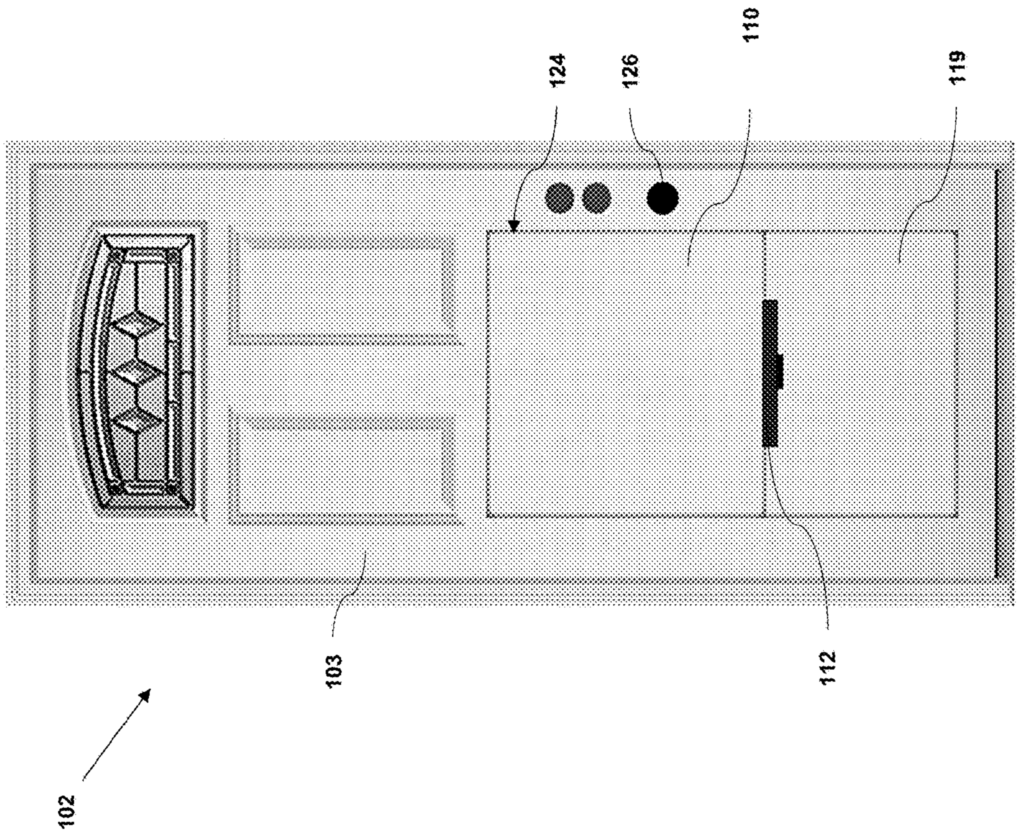
FIG. 29 is a rear view of the electronic delivery door shown in FIG. 28.
Figure 28:
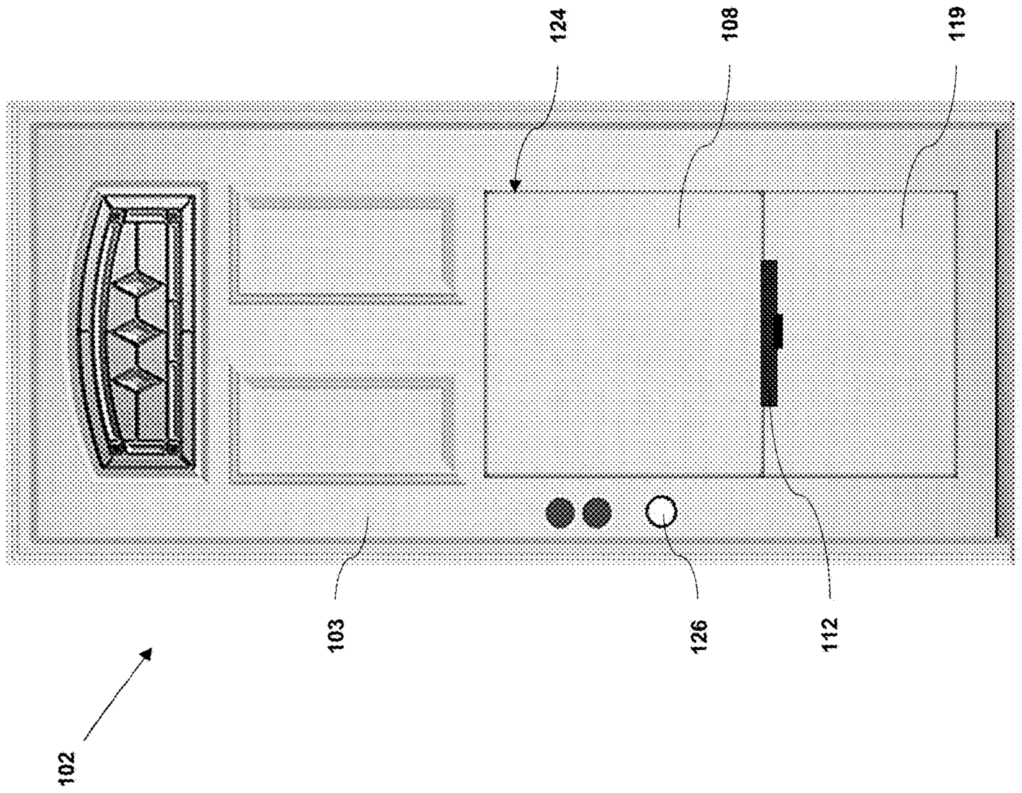
FIG. 28 is a front view of an example embodiment of an electronic delivery door having first and second door leaves, and a door panel secured within an opening in a residential door, wherein, in first operation mode, the first and second door leaves are secured by a double action hinge, and in a second operation mode, the first door leaf, the second door leaf, and the door panel are rotatable together about a central axis of an opening.
Figure 30:
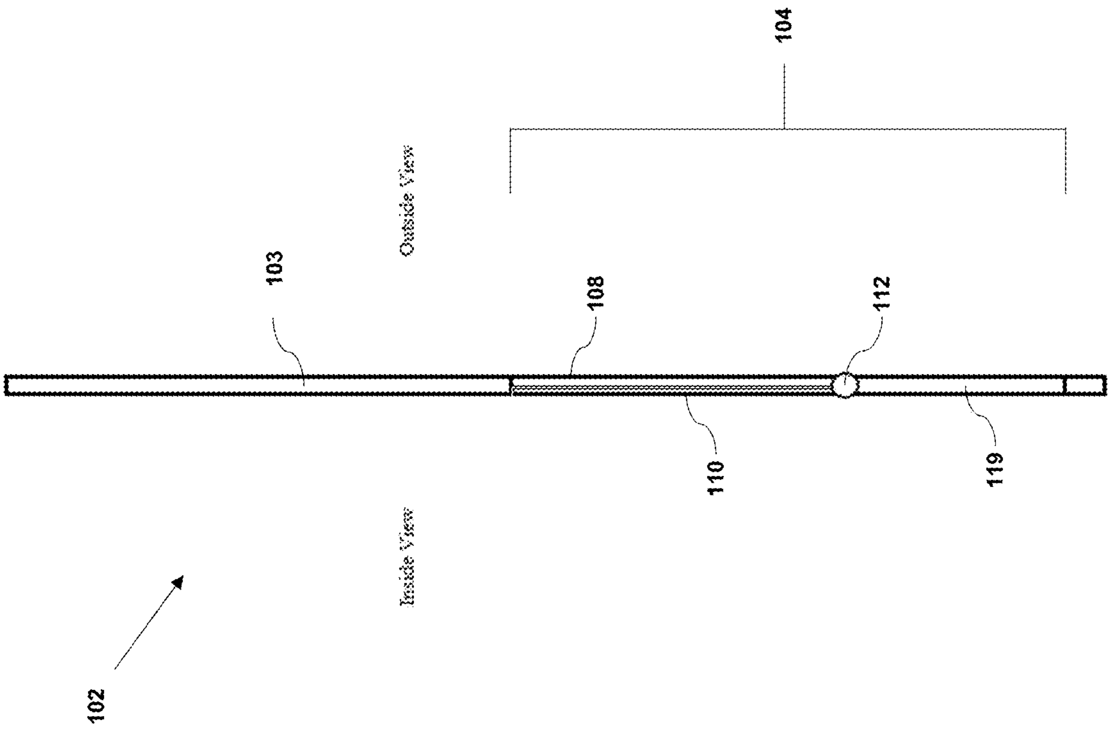
FIG. 30 is a side view of the electronic delivery door shown in FIGS. 28 and 29, the delivery door being shown in a first, or closed position.
Figure 31:
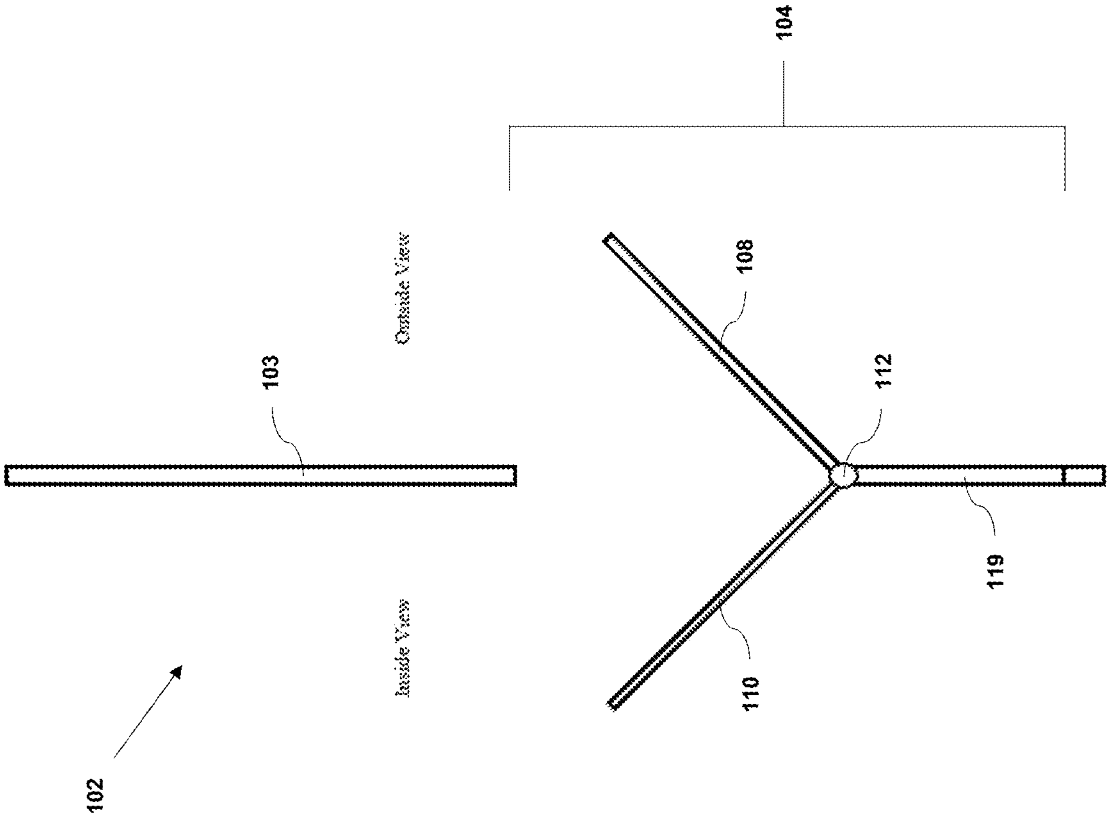
FIG. 31 is a side view of the electronic delivery door shown in FIGS. 28-30, the delivery door being shown in a second, or partially open position.
Figure 32:
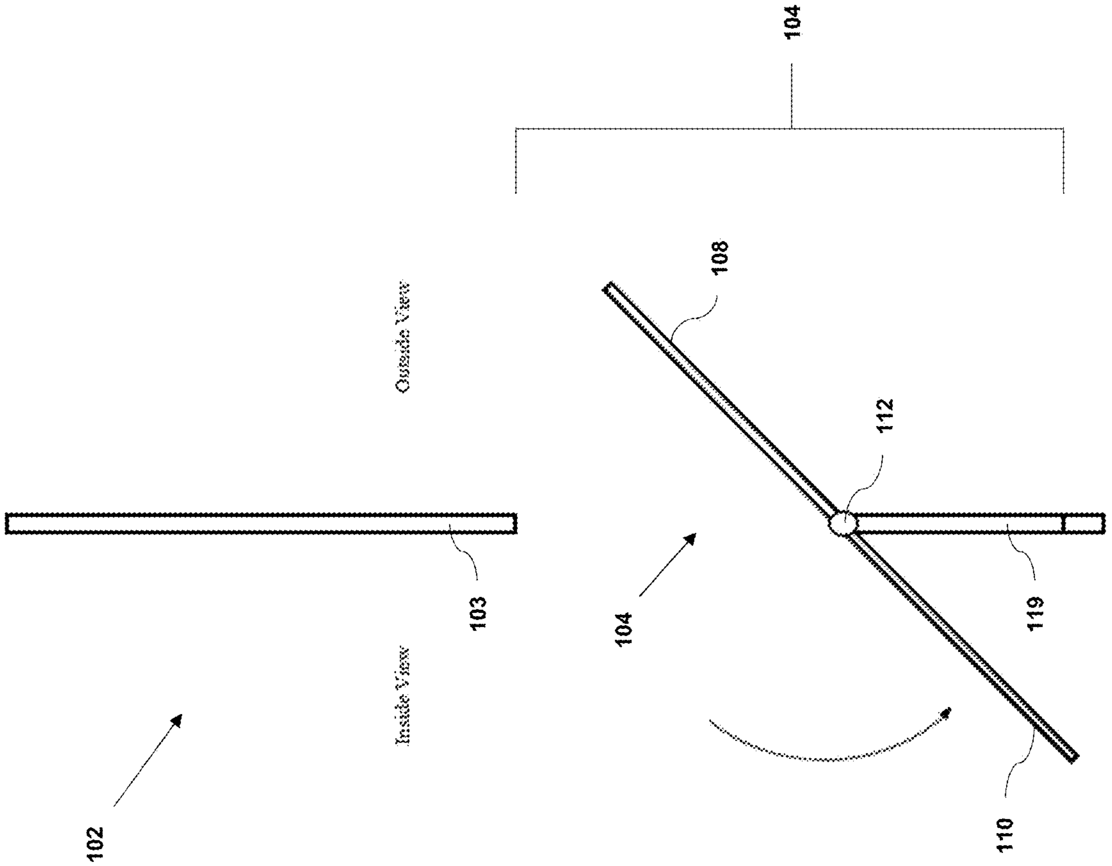
FIG. 32 is a side view of the electronic delivery door shown in FIGS. 28-31, the delivery door being shown in a third position, or fully open position.
Figure 33:
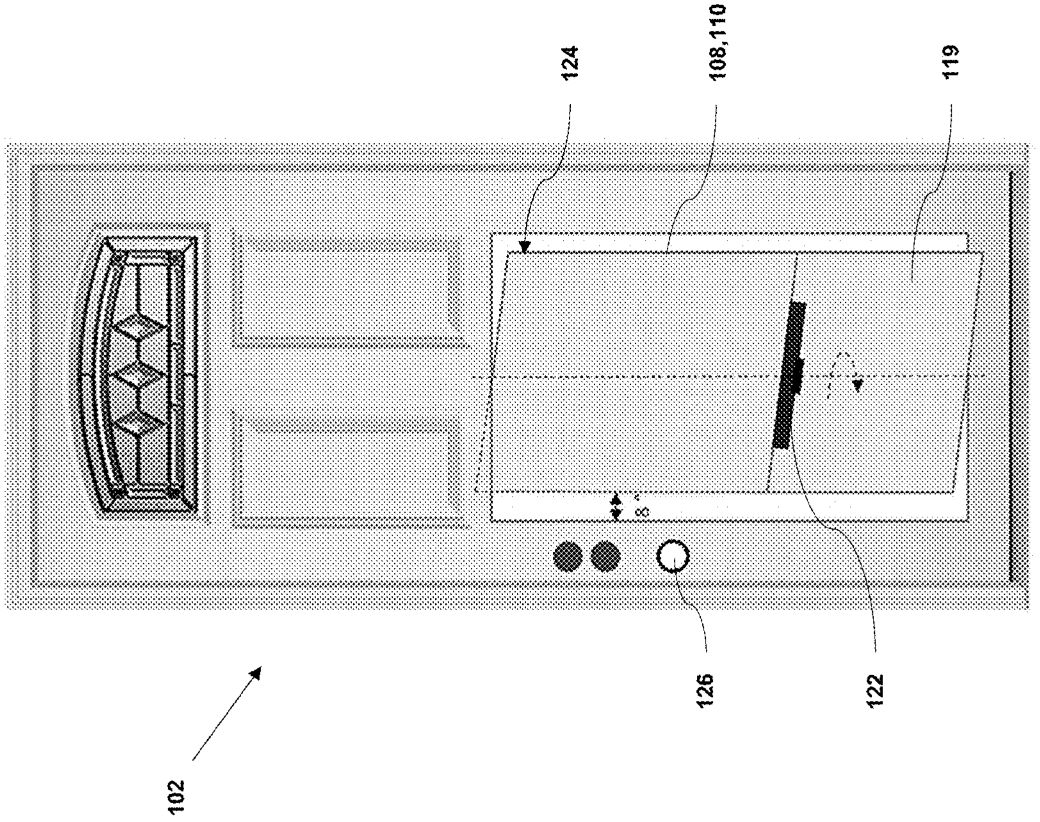
FIG. 33 is a front view of the electronic delivery door shown in FIGS. 28-32, depicted in a second open position as a result of rotation using a further hinge shown in greater detail in FIGS. 34-37.
Figure 35:
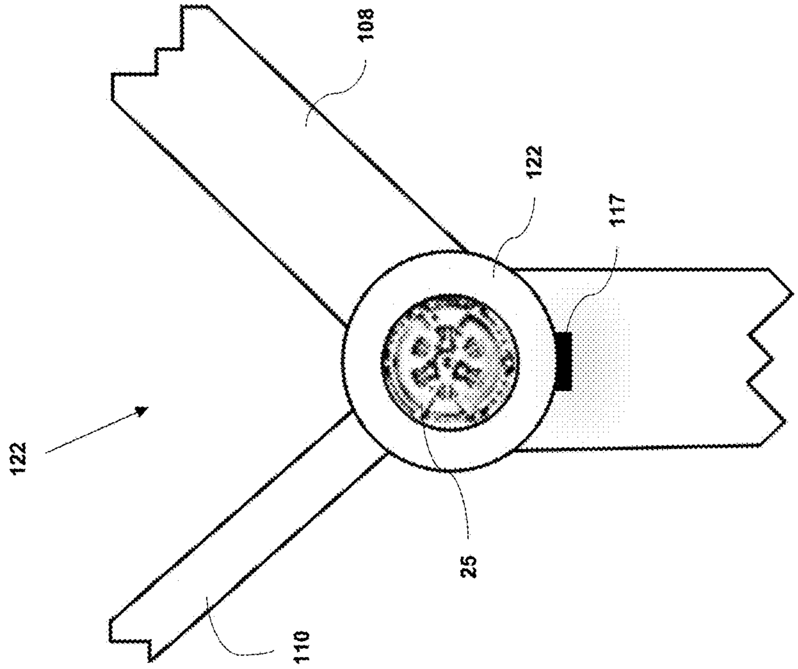
FIG. 35 is a side view of the electronic delivery door shown in FIG. 34.
Figure 34:
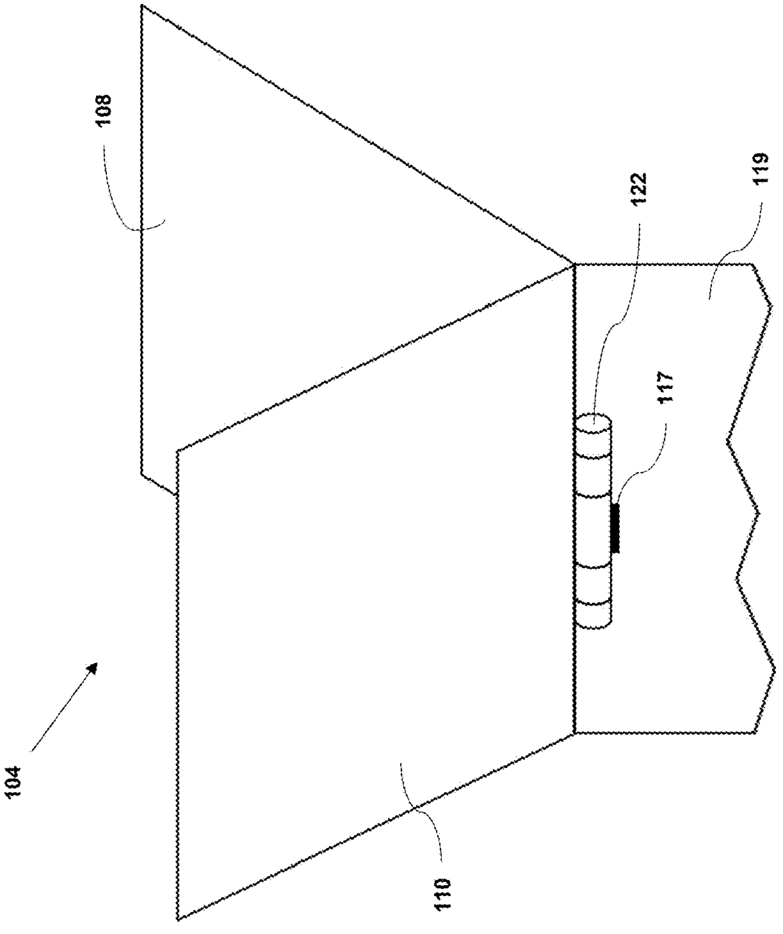
FIG. 34 is a perspective view of the electronic delivery door of FIGS. 28-33, the delivery door being shown in isolation.
Figure 36:
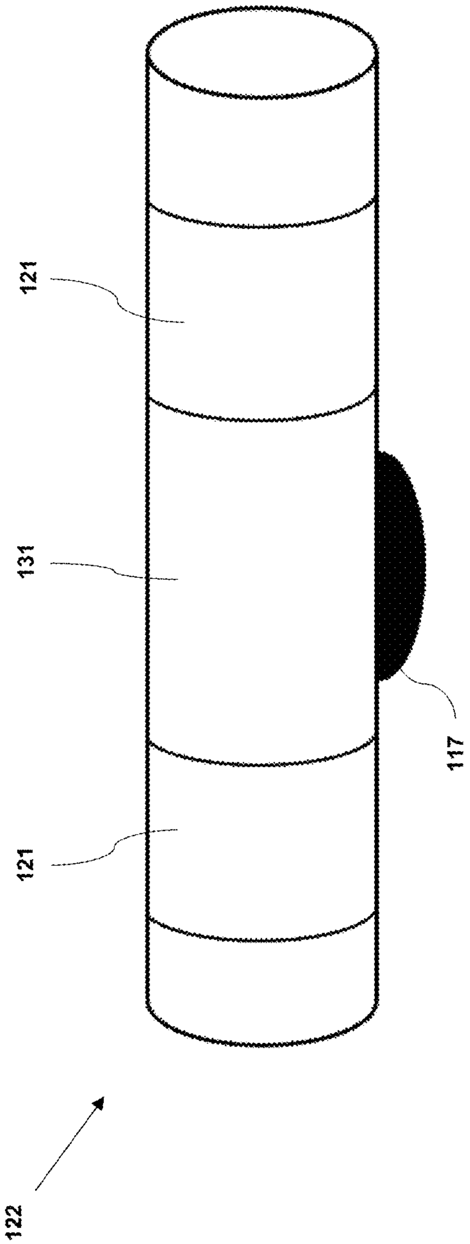
FIG. 36 is a front view of the motorized hinge assembly shown in FIGS. 28-35.

Another example embodiment of an electronic delivery system 40 is shown in FIGS. 23-25. The electronic delivery system 40 is similar to the system 30, but instead of an e-doorstop assembly, the system 40 comprises a motorized hinge assembly 48 which may function in a manner similar to the hinge assemblies described earlier herein. The motorized hinge assembly, shown in greater detail in FIG. 26, may include first and second hinges (51*a*,51*b*) for closing the door 44, and another hinge 53 for opening the door 44. The hinges (51*a*,51*b*,53) may also function to secure the door within the opening (in this case, defined by a door frame). The system 40 may further comprise an electronic foyer floor 47 with embedded weight sensors which may be in communication with the electronic security device and thus may initiate operation of the motorized hinge assembly 48 a pre-determined amount of time after the floor 47 detects that an object has been placed thereon. In alternative embodiments, the electronic foyer floor 47 may be in the form of weight sensors embedded in the door mat that can be positioned on the floor near the inside facing side of the door 44. The delivery system 40 may comprise an electronic security device (not shown) which may include or be in communication with an electronic authentication device (in this example embodiment, a barcode scanner 46) and which may also be in communication with the electronic foyer floor 47. The electronic security device may control the operation of the motorized hinge assembly as described with respect to the aforementioned example embodiments of electronic delivery doors and systems. FIG. 27 illustrates an alternative type of motorized hinge assembly 58 which may be used in the electronic delivery system 40.

Figure 37:
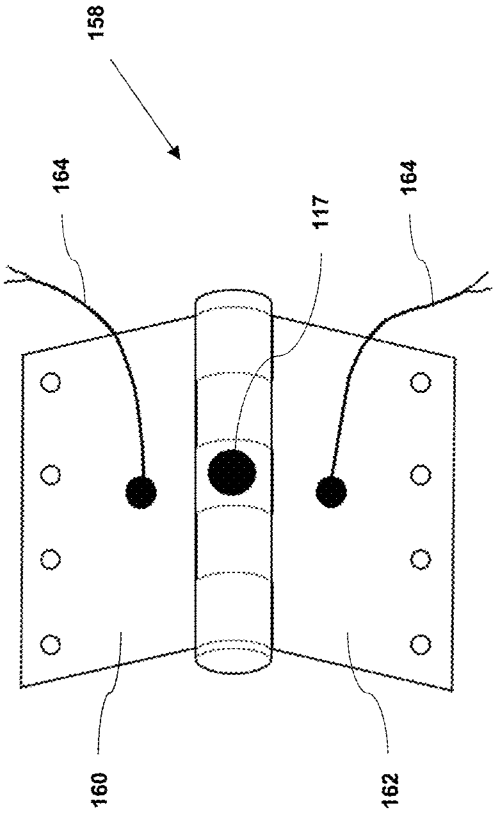
FIG. 37 illustrates another example of a motorized hinge assembly that may replace the assembly shown in FIG. 36.

FIGS. 28-37 illustrate yet another example embodiment of an electronic delivery system 102 similar to those described above in FIGS. 1-5, with an additional door panel 119 forming an electronic delivery door assembly 124 that includes rotational functionality resembling FIGS. 13-15 above; similar reference characters are used to refer to like elements. A difference between e-door assemblies 4 and 104 is that in the latter, one of the panels is not embedded in the other. FIG. 37 illustrates an alternative type of motorized hinge assembly 158 which may be used in the electronic delivery system 102 and, with minor respective variations, in delivery systems 2 and 20.

Examples of dimensions of the components of the electronic doors and systems described herein are illustrated in many of the Figures. Such dimensions are not intended to be limiting and may be changed to suit factors including, but not limited to, location of use (i.e., business, home, factory, etc.), desired e-door aesthetics, security requirements, and package size range requirements or preferences. While the e-doors and systems described herein are shown as being configured for installation in rectangular or square shaped openings, they may be modified for use in openings having other shapes such as, for example, triangular or circular openings.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

The examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. An electronic delivery door for permitting exchange of an object between an interior and an exterior of a structure through an opening defined in the structure, the structure having a structure depth, the electronic delivery door comprising:

a door panel comprising a first door leaf and a second door leaf;

a hinge assembly;

a motor, and an electronic security device;

the hinge assembly comprising:

first and second hinges for securing the first and second door leaves, respectively, within the opening of the structure and for permitting the first door leaf and second door leaf to move between a closed position and an open position by rotation of the first hinge and second hinge respectively, wherein:

in the closed position of the first door leaf and second door leaf, the opening is covered by the door panel; and in the open position of the first door leaf and second door leaf, the the first hinge and second hinge have been rotated to permit passage of the object through the opening;

the first hinge and second hinge being configured to be positioned coaxially to one another, wherein, when the first door leaf and second door leaf are is in the closed position, the first door leaf and second door leaf abut one another in a face-to-face configuration; said first door leaf and second door leaf being co-linear along a first edge of the first door leaf and second door leaf on a first side and said second door leaf is surrounded on and abuts at least three sides of the perimeter of said first door leaf and wherein the first door leaf has a depth that is equal to the structure depth and includes a recess for receiving the second door leaf when the first door leaf and second door leaf are is in the closed position;

wherein said first door leaf rotates from the closed position to the open position in a first direction and said second door leaf rotates from the closed position to the open position in an opposite direction from the first direction such that in an open position of the first door leaf and second door leaf, said first door leaf and said second door leaf create a V-shaped receptacle for receipt of the object;

the motor being contained within the hinge assembly for controlling the position of the first door leaf and second door leaf; and wherein the electronic security device is configured to selectively permit opening of the door panel to allow the object to pass therethrough, the object having a known weight;

the electronic security device comprising a barcode scanner and an electronic security device;

said barcode scanner configured to scan a barcode on the object and sends information about the object to the electronic security device;

said information about the object comprising object weight and object dimensions;

said electronic security device configured to control said motor to open the door panel to a minimum amount to allow passage of the object, wherein said minimum amount is based on the object dimensions; and wherein the electronic security device includes or is in communication with weight sensors and is configured to stop motion of said first door leaf and second door leaf or close the electronic delivery door when the weight sensors detect a weight that does not correspond with the object weight.

2. The electronic delivery door of claim 1, wherein the electronic security device includes or is in communication with the barcode scanner and is configured to permit movement of the door panel when the barcode scanner detects a valid barcode.

3. The electronic delivery door of claim 1, wherein the electronic security device includes or is in communication with a proximity sensor and is configured to permit movement of the door panel when the proximity sensor detects an authenticated electronic device within a pre-determined proximity to the proximity sensor.

4. The electronic delivery door of claim 1, wherein the electronic security device includes or is in communication with a security keypad and is configured to permit movement of the door panel when a valid security code is entered on the security keypad.

5. The electronic delivery door of claim 1, wherein the electronic security device is communicatively coupled to at least one computing device and is configured to permit movement of the door panel in response to a command received from the at least one computing device;

wherein the at least one computing device is pre-authorized by an administrator of the electronic security device.

6. The electronic delivery door of claim 1, wherein, when the first door leaf and the second door leaf are in the closed position, the first door leaf and second door leaf are configured such that the first door leaf forms at least a majority of an exterior surface of the door panel and the second door leaf forms at least a majority of an interior surface of the door panel.

7. The electronic delivery door of claim 1, wherein the first and second hinges are integrated as a double action hinge.

8. The electronic delivery door of claim 1, wherein the motor is configured for rotating the first hinge and second hinge by one or more pre-determined amounts.

9. The electronic delivery door of claim 8, wherein the one or more pre-determined amounts of hinge rotation are based at least in part on object dimensions and/or security settings.

10. The electronic delivery door of claim 9, wherein the electronic security device is configured to receive the object dimensions.

11. The electronic delivery door of claim 9, wherein the security settings are stored by the electronic security device and can be adjusted by an owner of the electronic delivery door.

12. The electronic delivery door of claim 8, wherein the motor controls a rotatable mechanism provided within the hinge.

13. The electronic delivery door of claim 1, wherein the weight sensors are located within the hinge assembly.

14. The electronic delivery door of claim 1, wherein the weight sensors are located within the first door leaf.

15. The electronic delivery door of claim 1, wherein the weight sensors are located within the second door leaf.

* * * * *